US011209564B2

(12) United States Patent
Yoo et al.

(10) Patent No.: US 11,209,564 B2
(45) Date of Patent: Dec. 28, 2021

(54) DEGHOSTING OF SEISMIC DATA THROUGH ECHO- DEBLENDING USING COINCIDENCE FILTERING

(71) Applicant: Saudi Arabian Oil Company, Dhahran (SA)

(72) Inventors: Jewoo Yoo, Delft (NL); Roald van Borselen, Voorschoten (NL); Robertus F. Hegge, Rijswijk (NL)

(73) Assignee: Saudi Arabian Oil Company, Dhahran (SA)

( * ) Notice: Subject to any disclaimer, the term of this patent is extended or adjusted under 35 U.S.C. 154(b) by 758 days.

(21) Appl. No.: 16/038,540

(22) Filed: Jul. 18, 2018

(65) Prior Publication Data

US 2020/0025960 A1    Jan. 23, 2020

(51) Int. Cl.
*G01V 1/36* (2006.01)
*G01V 1/30* (2006.01)
*G01V 1/38* (2006.01)

(52) U.S. Cl.
CPC .............. *G01V 1/364* (2013.01); *G01V 1/302* (2013.01); *G01V 1/3808* (2013.01); *G01V 2210/56* (2013.01)

(58) Field of Classification Search
None
See application file for complete search history.

(56) References Cited

U.S. PATENT DOCUMENTS

| 8,792,296 | B2 | 7/2014 | Soubaras | |
| 2011/0305109 | A1 | 12/2011 | Soubaras | |
| 2013/0301386 | A1 | 11/2013 | Grion | |
| 2014/0362658 | A1 | 12/2014 | Poole | |
| 2015/0109881 | A1* | 4/2015 | Poole et al. | G01V 1/364 |
| 2015/0285935 | A1 | 10/2015 | Savels et al. | |
| 2019/0243018 | A1* | 2/2019 | Schneider, Jr. | G01V 1/364 |

OTHER PUBLICATIONS

GCC Examination Report in GCC Appln. No. GC 2019-37943, dated Jun. 27, 2020, 4 pages.

(Continued)

*Primary Examiner* — Hovhannes Baghdasaryan
(74) *Attorney, Agent, or Firm* — Fish & Richardson P.C.

(57) ABSTRACT

Methods, systems, and apparatus, including computer programs encoded on a computer storage medium, for echo-deblending using coincidence-filtering of offshore seismic data. In one aspect, a method includes receiving an offshore seismic dataset of a surveyed subsurface, the offshore seismic dataset comprising a primary-wave signal and a ghost-wave signal; determining a forward extrapolation and a backward extrapolation for the offshore seismic dataset; determining a coincident signal by applying a coincidence filtering to the forward extrapolation and the backward extrapolation; extrapolating the coincident signal to determine a ghost-wave value for the ghost-wave signal; applying adaptive subtraction to the offshore seismic dataset with the ghost-wave value to determine a computed primary-wave value for the primary-wave signal; generating a model of the surveyed subsurface based on primary-wave data calculated from the offshore seismic dataset based on the computed primary-wave value; and evaluating a productivity of the surveyed subsurface according to the model.

20 Claims, 16 Drawing Sheets

(56) References Cited

OTHER PUBLICATIONS

Berkhout et al., "From removing to using ghost reflections", Delft University of TechnologySEG Technical Program Expanded Abstracts 2015, pp. 5107-5111, Aug. 2015, 5 pages.
PCT International Search Report and Written Opinion in International Appln. No. PCT/US2019/041933, dated Oct. 8, 2019, 17 pages.
Yoo et al., "Deghosting through Notches Using Echo Deblending—Synthetic and Field Data Examples", 79th EAGE Conference & Exhibition 2017, Jun. 12, 2017, 5 pages.
Berhout and Verschurr, "Focal transformation, an imaging concept for signal restoration and noise removal," Geophysics vol. 71, No. 6, Nov.-Dec. 2006, 5 pages.
Berkhout and Blacquiere, "Deghosting by echo-delending," 77th EAGE Conference and Exhibition, 2015 IFEMA Madrid, Spain, Jun. 1-4, 2015, 5 pages.
Berkhout and Blacquiere, "Deghosting by echo-delending," Geophysical Prospecting, vol. 64, No. 2, Mar. 2016, 15 pages.
Carlson et al., "Increased resolution and penetration from a towed dual-sensor streamer," Marine Seismic, Special Topic, first break, vol. 25, Dec. 2007, 7 pages.
Fokkema and Van Den Berg, "Seismic applications of acoustic reciprocity," Elsevier, Oct. 1993, 352 pages.
Parkes and Hegna, "A marine seismic acquisition system that provides a full 'ghost-free' solution," SEG San Antonio 2011 Annual Meeting, Jan. 2011, 5 pages.
Poole, "Pre-migration receiver de-ghosting and re-datuming for variable depth streamer data," SEG Houston 2013 Annual Meeting, Sep. 2013, 5 pages.
Riyanti et al., "Pressure wave-field deghosting for non-horizontal streamers," SEG Las Vegas 2008 Annual Meeting, Nov. 9-14, 2008, 5 pages.
Soubaras et al., "Variable-depth streamer—a broadband marine solution," Marine Seismic: Special Topic, first break, vol. 28, Dec. 2010, 8 pages.
Vassalo et al., "B042: Reconstruction of the Subsurface reflected Wavefield on a Dense Grid from Multicomponent Streamer Data," Copenhagen, 74th EAGE Conference and Exhibition incorporating SPE EUROPEC Jun. 4-7, 2012, 5 pages.
Yoo et al., "3D Deghosting using Echo Deblending—Synthetic and Field data examples," SEG International Exposition and 87th Annual Meeting, presented at Sep. 27, 2017, 5 pages.
Yoo et al., "Deghosting through the notches using 3D Echo Deblending—Synthetic and Field data examples and Abstract," Presentation Outline, Aramco, 79th EAGE Conference and Exhibition, Jun. 12-15, 2017, 40 pages.
GCC Examination Report in GCC Appln. No. GC 2019-37943, dated Nov. 1, 2020, 4 pages.
GCC Examination Report in GCC Appln. No. GC 2019-37943, dated May 5, 2021, 4 pages.

* cited by examiner

DEGHOSTING OF SEISMIC DATA THROUGH ECHO- DEBLENDING USING COINCIDENCE FILTERING

TECHNICAL FIELD

This disclosure relates to methods, systems, and apparatus for improving the exploration for hydrocarbons under a body of water.

BACKGROUND

In the exploration for hydrocarbons, geophysical structures under the bed of a body of water can be mapped through a marine seismic survey that includes recording and processing seismic data. For example, recorded seismic data may include pressure or particle motion related data regarding the propagation of seismic waves through the earth. An image or model depicting the various layers that form the surveyed subsurface may be generated based on this recorded seismic data. This imaging information is useful in determining the presence of reservoirs of various hydrocarbons.

SUMMARY

The present disclosure describes methods and systems, including computer-implemented methods, computer-program products, and computer systems, for echo-deblending using coincidence-filtering of offshore seismic data, which complements the amplitude thresholding during the deblending step with travel-time matching.

In a general implementation, an offshore seismic dataset of a surveyed subsurface is received. The offshore seismic dataset includes primary-wave signal and ghost-wave signal. A forward extrapolation and a backward extrapolation are determined for the offshore seismic dataset. A coincident signal is determined by applying a coincidence filtering to the forward extrapolation and the backward extrapolation. The coincident signal is extrapolated to determine a computed ghost-wave signal. Adaptive subtraction is applied to the offshore seismic dataset with the computed ghost-wave signal to determine a computed primary-wave signal. A model of the surveyed subsurface is generated based on primary wave data calculated from the offshore seismic dataset based on the computed primary-wave signal. A productivity of the surveyed subsurface is evaluated according to the model.

Implementations include processes to improve the accuracy of marine seismic surveys used to map surveyed subsurfaces under realistic acquisition conditions. By employing echo-deblending using coincidence filtering the described system can mitigate issues, such as uncertainty of parameter selection for the amplitude thresholding, noise boosting in the notch, and the requirement of exact acquisition information, such as water velocity, source/receiver depth, and dense dataset for three-dimensional (3D) dataset. For example, the amplitude thresholding may be based on an assumption that the amplitude of desired ghost-free wavefield will be doubled by the summation of forward and backward extrapolated signal. This assumption is true when the forward and backward extrapolations are done correctly, which requires that all acquisition related information is exact and the data sampling rate is small enough for the wavefield extrapolation. However, in most cases, these requirements are not met and the echo-deblending method with amplitude thresholding generates strong artifacts when the extrapolation operator is not exact. The presently described system computes the desired wavefield from coincidence filtering method, and as the result, small misfits in the extrapolated signals are not generating severe ringing artefacts. (See for example, Figures (FIGS. 10A-10D which depicts the deghosting result obtained with the described system).

The details of one or more implementations of the subject matter of this specification are set forth in the accompanying drawings and the later description. Other features, aspects, and advantages of the subject matter will become apparent from the description, the drawings, and the claims.

DETAILED DESCRIPTION

This disclosure generally describes an optimization methodology for deghosting seismic data to improve the modeling of surveyed subsurfaces. The disclosure is presented to enable any person skilled in the art to make and use the disclosed subject matter in the context of one or more particular implementations. Various modifications to the disclosed implementations will be readily apparent to those skilled in the art, and the general principles defined in this application may be applied to other implementations and applications without departing from scope of the disclosure. Thus, the present disclosure is not intended to be limited to the described or illustrated implementations, but is to be accorded the widest scope consistent with the principles and features disclosed in this application.

Figure 1A:
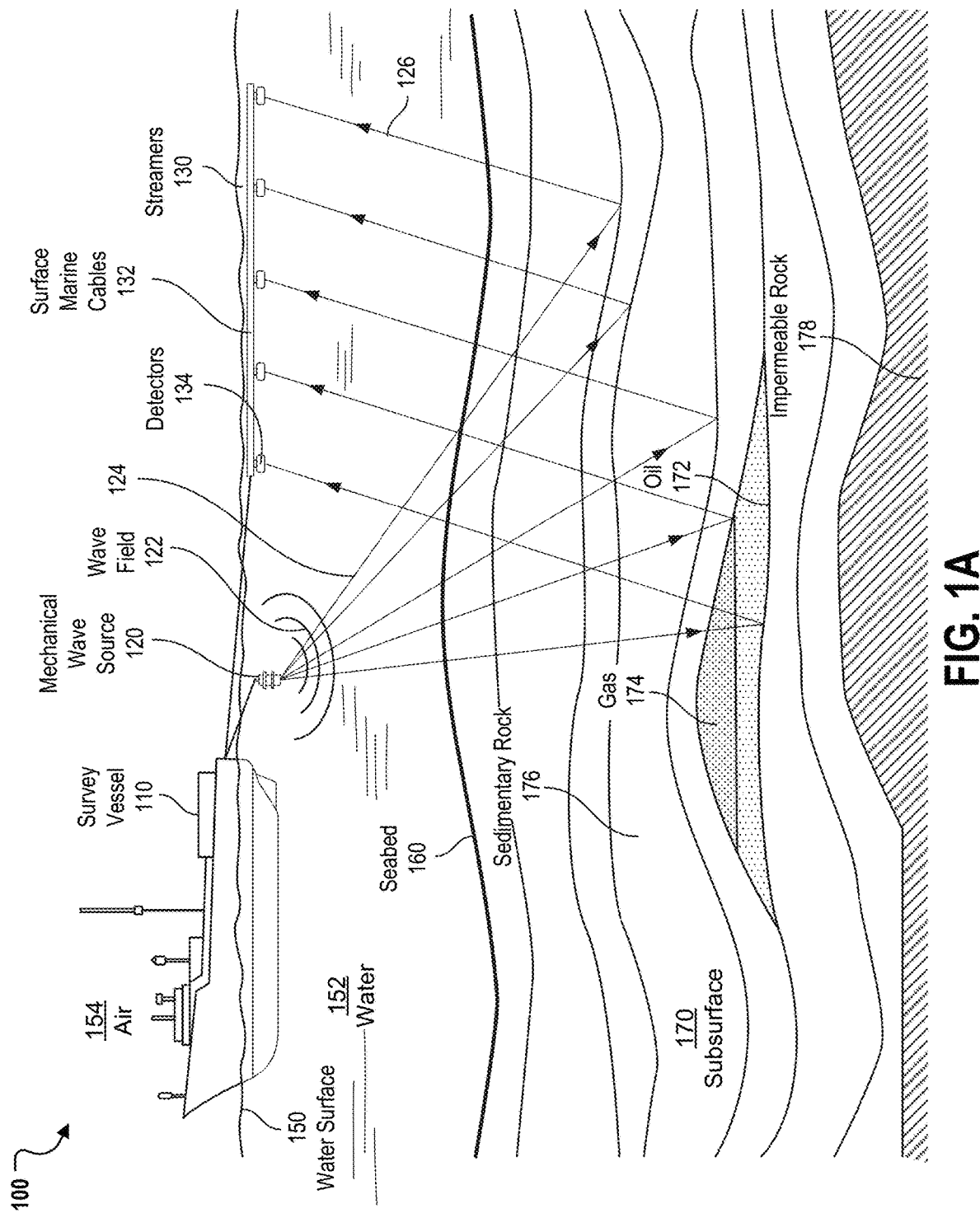
FIGS. 1A-1B depict an example system to conduct marine seismic surveys to locate potential well sites for the drilling of hydrocarbons.
Figure 1B:
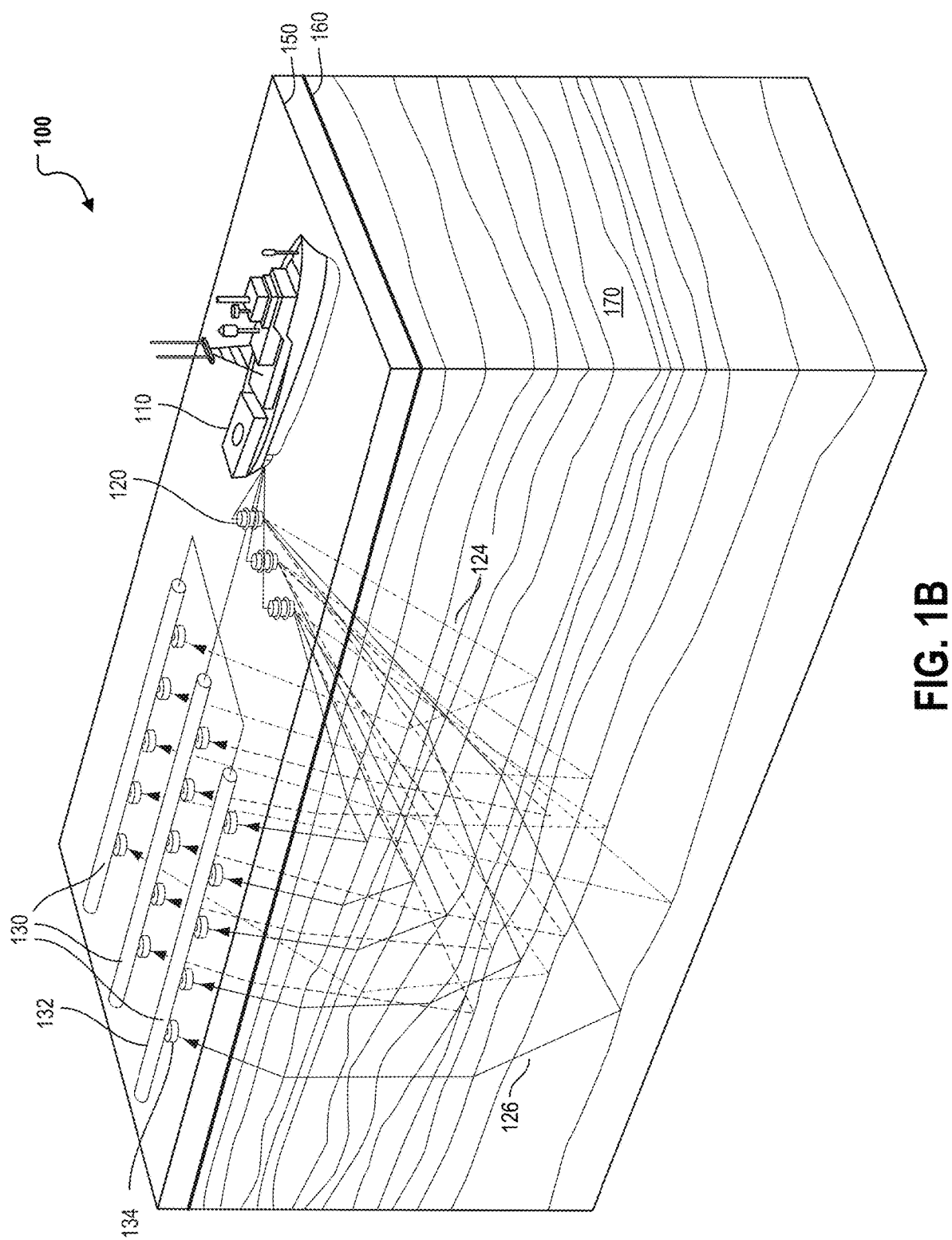

FIGS. 1A-1B depict an example system 100 to conduct marine seismic surveys. Such marine seismic surveys may be used to probe beneath the surface of the seabed 160 to discover the underlying features that make up the underground structures to, for example, locate potential well sites for the drilling of hydrocarbons. The example system 100 includes a survey vessel 110 that is towing a mechanical wave source(s) 120, such as a seismic wave source, and one or more streamers 130 at a certain location. The mechanical wave source 120 may include a plurality of gun arrays that are used as source devices to generate an impulse of energy or waves 122 during marine seismic acquisition. A gun array may include several sub-arrays, each being a linear (rigid or soft) alignment of floats to which guns are roped and submerged. For example, the gun array may be submerged to a depth from 6 to 10 meters (m) (other depth may be used depending on, for example, the type of gun array, topography, weather conditions, and so forth). The types of guns used to generate the waves of energy may include, for example, water guns, air guns, marine vibrators, or sleeve guns. Other types of mechanical wave source 120 include explosives, such as dynamite and water gel explosives.

A water gun includes a piston that is driven through the water to produce a vacuum bubble. When this bubble collapses, acoustic energy is radiated. The pressure signature from a water gun has pressure variations or a precursor before the main pressure pulse. This precursor is caused by the initial acceleration of the water, and special water gun processing (signature deconvolution) must be performed.

An air gun includes one or more pneumatic chambers that are pressurized with, for example, compressed air. When an air gun is fired, a solenoid is triggered. The triggered solenoid releases air into a fire chamber which in turn causes a piston to move, thereby allowing the air to escape the main chamber. This release of air generates a pressure pulse and forms an air bubble. This air bubble oscillates, generating a sequence of decaying pressure variations that follow the initial pulse.

In some implementations, the mechanical wave source 120 is an air gun array that includes air guns of different volumes. The volume of air in the bubble and its pressure depends on the size of the air gun used and the pressure at which it is operated. When multiple air guns are fired in close vicinity of one another, it is possible to get a strong initial pulse and a weak bubble sequence because the composite bubble formed is not spherical and thus does not tend to support oscillations. Firing of these air guns creates bubble oscillations that are of different periods, which tend to cancel one another while the initial pulses reinforce. Thus, a signal approaching an impulse is generated and measured based on its response of the earth. For example, the array can be fired in concert to create an optimum initial shock wave followed by a minimum reverberation of the air bubble(s).

The output of the mechanical wave source 120 may be illustrated by a normalized pressure time sequence referred to as a signature. One measure of the strength of the source is the peak-to-peak pressure, which is often quoted in pressure units of bars at 1 bar meters. Another measure of the performance of the array is the peak-to-bubble ratio, which is the peak-to-peak magnitude of the initial pulses divided by the magnitude of the residual bubble oscillations.

The one or more streamers 130 include surface marine cables 132. The marine cables 132 are buoyant assembly of electrical wires that connects the detectors 134. In some implementations, the detectors 134 are mounted throughout a certain length of the cable 132 and electrically connected in series and parallel to form a detector array, a station, or a group. For example, a group may be formed along a defined length of the cable 132 and include a number of the detectors 134.

In some implementations, the detectors 134 are piezoelectric devices, such as a hydrophone, that create an electrical signal in response to pressure changes. In other implementations, the detectors 134 are microelectromechanical systems (MEMS) devices that can also measure particle velocity components. These detectors 134 are employed within the example system 100 to detect the mechanical waves generated by the mechanical wave source 120 that are reflected or refracted by the seabed 160, the subsurface 170, or both. In some implementations, the cables 132 include electronics to convert an analog signal generated by the detectors 134 to a digital data.

As depicted in FIGS. 1A-1B, multiple streamers 130 may be deployed from the vessel 110 to increase the amount of data acquired in each pass. The streamers 130 may be disposed horizontally, for example, at a constant depth, or at an angle relative to the water surface 150 of a body of water, such as an ocean or lake. The air 154 is above the water surface 150. In some implementation, the streamer may be several thousand meters long based on the objective of the survey being performed by the system example 100.

As shown in FIG. 1A, the mechanical wave sources 120 can generate mechanical waves, such as seismic waves, some of which propagate downward and penetrate the seafloor 140. The effective pressure wavefield emitted by the mechanical wave sources 120 includes the linear sum of two constituents: the primary source component propagates directly from the source downwards into the subsurface, the secondary source component propagates upwards to the free-surface before it is reflected off the free-surface again to propagate as a down-going "ghost" wavefield. Hence, the total measured pressure wavefield can be considered as a blended wavefield. The mechanical wave sources 120 may provide single pulses or continuous sweeps of energy, generating the waves 122. The waves 122 emitted by the mechanical wave sources 120 may be substantially spherical (for example, a wave propagates in all directions from the mechanical wave sources 120). The generated waves may be referred to as a wavefield. The generated wavefield 122 travels through a medium such as water 152 and subsurface 170. Some of the waves travel downward and are then reflected and refracted by the seabed 160 or the subsurface 170. These particular wave paths of the wavefield 122 are depicted in FIGS. 1A and 1B as downward propagated wave 124 and reflected wave 126. The reflected or refracted waves 126 propagate upwardly and are detected by the detectors 134. The downward propagated wave 124 and the reflected waves 126 are referred to as the primary or ghost-free wave (see FIGS. 2A-2C). The recorded primary waves may be used to determine the composition and features and the subsurface 170 below the seabed 160. Such structures of the subsurface 170 may include oil 172, gas 174, sedimentary rock 176, and impermeable rock 178.

Figure 2B:
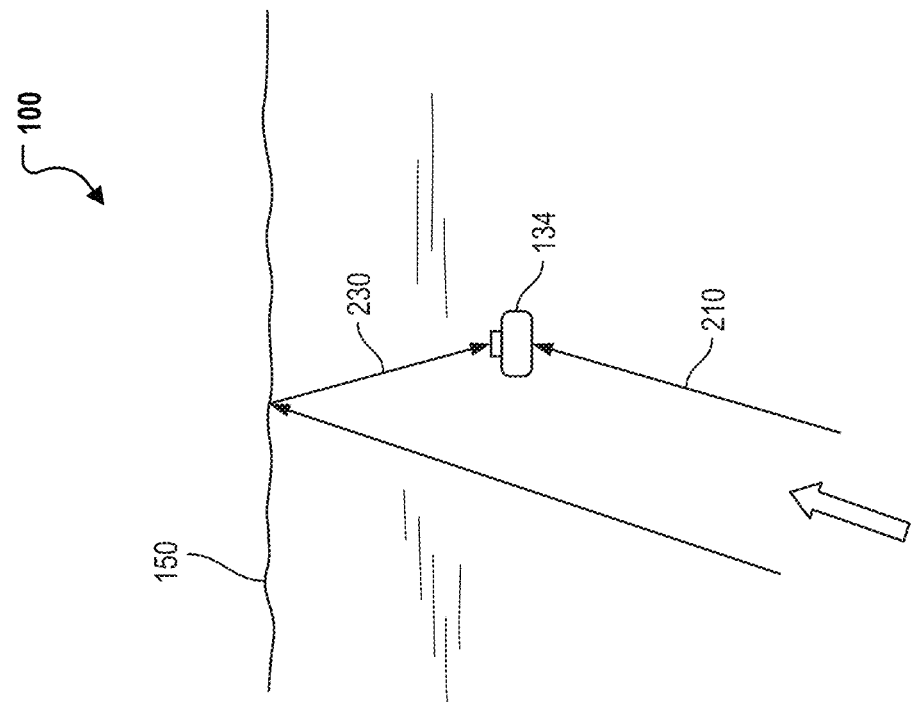
FIGS. 2A-2C depict a primary-wave and various ghost waves that may be received by detectors.
Figure 2A:
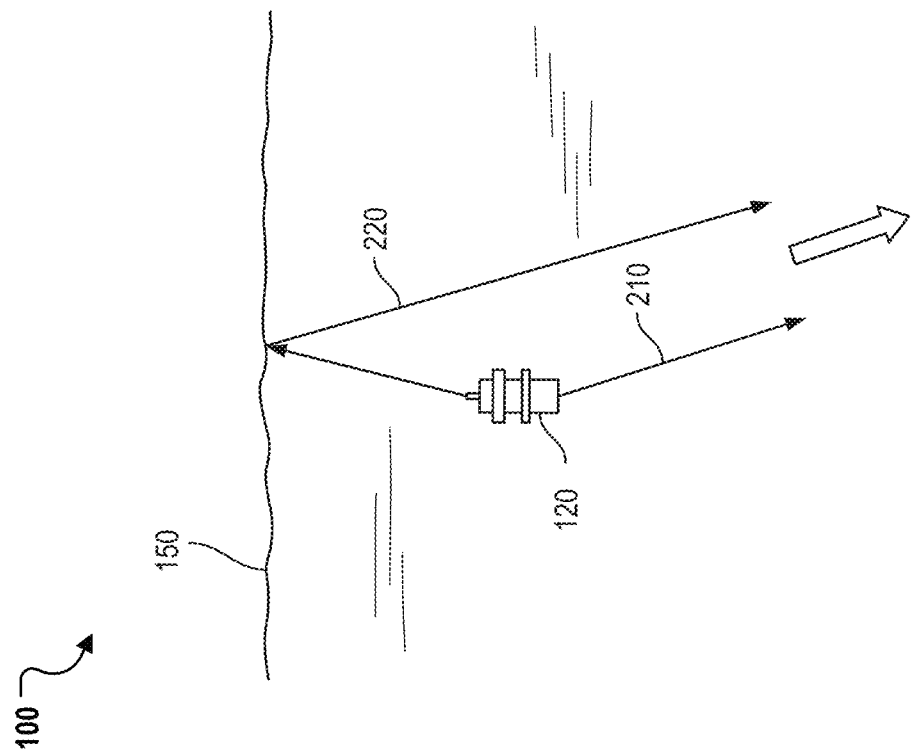
Figure 2C:
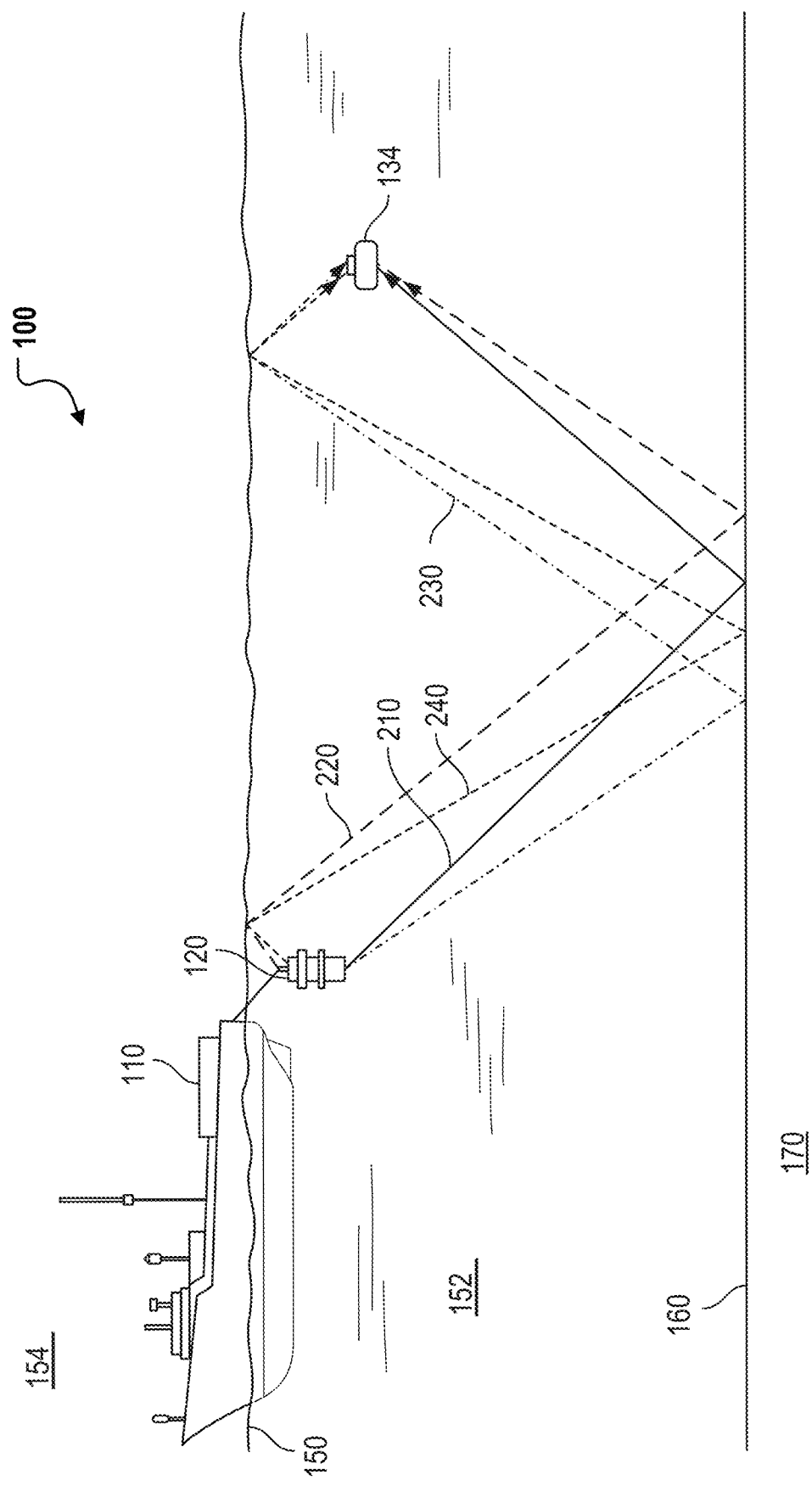

FIGS. 2A-2C depict the primary wave 210 and various ghost waves 220, 230, and 240 that may be received by detectors 134. As depicted in FIGS. 1A-1B, the wavefield emitted by the mechanical wave source 120 initiates a pressure wavefield in all directions. The interface between the water and air, represented as the water surface 150 in FIGS. 1A-1B and 2A-2C, is well approximated as a quasi-perfect reflector. As such, the water surface 150 acts as a mirror for the generated waves 122. Waves 220, 230, and 240 that are reflected by the water surface 150 are then detected by detectors 134. These waves (220, 230, and 240) are referred to as ghost waves because the waves are due to a spurious reflection. When the energy from the ghost waves 220, 230, and 240 combines with the primary wave 210, the wave shape is changed and the "ghost" is created.

FIG. 2A depicts primary wave 210 and source ghost wave 220. As depicted in FIG. 2A, the upward traveling source wavefield reflects from the water surface 150 to generate the source ghost waves 220. The source ghost wave 220 follows the primary wave 210 with a certain delay.

FIG. 2B depicts the primary wave 210 and receiver ghost waves 230. As depicted in FIG. 2B, the source wavefield may be reflected in an upward trajectory from the seabed 160, pass the detectors 134, and reflected by the water surface 150 to generate the received ghost waves 230. Once reflected by the water surface 150, the receiver ghost waves 230 are detected by the detectors 134 with a certain delay from the primary wave 210.

FIG. 2C depicts the example system 100 including the source ghost waves 220, the receiver ghost waves 230, and source and receiver ghost waves 240. The source and receiver ghost waves 240 are reflected by the water surface 150 both near the mechanical wave source 120, such as the source wave 210, and also near the detectors 134, such as reflector wave 230. The ghost waves 220, 230, and 240 are also recorded, but with a reverse polarity and a time lag relative to the primary wave 210. When the primary wave 210 and the reflected waves 220, 230, and 240 are detected at the detectors 134, the reflections appear as a double image.

These "ghost" reflections interfere, either constructively or destructively, with the primary wave 210. Due to this "ghosting", certain frequencies are interfered with while other frequencies are boosted. Additionally, some frequencies may be completely eliminated or "notched" by this ghosting effect. To state another way, the ghost waves distort the frequency by creating spectral notches and the phase spectrum of the recorded seismic data. For example, the arrival of the ghost waves 220, 230, and 240 at the detector 134 may have a degenerative effect and cause notches, or gaps, in the frequency content recorded. These notches cause inaccuracies in an image or model of the subsurface 170 generated based on the received waves.

Deghosting is the process of removing the ghost waves' information from the results of the seismic analysis. Further, measurements can be processed for obtaining the correct position of the various parts (reflectors) of the subsurface 170. Such a processing method is the migration.

Echo-deblending is a deghosting method to remove the ghost events present in marine seismic data through the use of wavefield extrapolation to separate the primary seismic event of interest, such as primary wave 210, from the ghosts, such as ghost waves 220, 230, and 240, through deblending. One advantage of echo-deblending over inversion-based methods is that the (full-bandwidth) seismic event of interest is merely separated from the ghosts. As such, no spectral recovery of frequency-wavenumber constituents is needed.

Echo-deblending builds on the realization that ghosts are produced by (virtual) secondary sources that have been generated by the free surface. In some embodiments, amplitude thresholding is used as a constraint during deblending. Primary and secondary source data are forward and backward propagated using 3D wavefield extrapolation operators after which ghosts are separated by utilizing deblending techniques. Using forward and backward 3D wavefield extrapolation operators, it is then possible to describe the blended total pressure wavefield due to a single source placed at the free surface, as a summation of the two sources: the primary source that has been back-propagated to the free surface, and the secondary source that has been forward propagated to the free-surface, deconvolved with the angle-frequency dependent on the reflectivity at the free-surface. Due to a lack of detailed information about the reflectivity, it may be assumed to equal −1, accounting only for polarity reversal.

Echo-deblending aims to remove the ghosts through non-linear filtering of 3D extrapolated results. As such, no inversion step is needed where interference effects between up- and down-going wavefields are to be compensated for. This is a clear strength of the method, as it prevents noise to be enhanced during the deghosting application. After deghosting, the amplitude spectrum of the resulting full-stack section can show improvement in recovering both the low frequencies and the notches that were weakened by the ghost waves. However, the seismic spectrum may have a linear decay or roll-off of amplitude in the high-frequency content, especially in the deep part of the section. The loss of higher frequencies is due to the earth's absorption effect (known as "Q") and can be recovered with the application of pre-stack amplitude-only Q-compensation.

In view of the forgoing, the described system employs echo-deblending using coincidence-filtering, which complements the amplitude thresholding during the deblending step with travel-time matching. By employing echo-deblending using coincidence-filtering the described system improves the accuracy of results under realistic acquisition conditions, such as the presence of noise and uncertainties in source-depth, receiver depths, or both. With coincidence-filtering, the echo-deblending method can mitigate issues, such as uncertainty of parameter selection for the amplitude thresholding; noise boosting in the notch; and the requirement of exact acquisition information, such as water velocity, source/receiver depth, and dense dataset for 3D dataset.

In signal processing, particularly digital image processing, ringing artefacts are artefacts that appear as spurious signals near sharp transitions in a signal. Visually, these artefacts appear as bands near edges; audibly, they appear as "echoes" near transients, particularly sounds from percussion instruments; most noticeable are the pre-echoes. The term "ringing" is because the output signal oscillates at a fading rate around a sharp transition in the input, similar to a bell after being struck. As with other artefacts, their minimization is a criterion in filter design. The described system obtains results without severe ringing with the information provided. The coincidence filtering detects coincident signals in both time and space between forward and backward extrapolated data. When the wavefield extrapolation operator is not exact due to some reasons, such as acquisition related uncertainties or not enough spatial sampling (coarsely sample rate), the computed coincident signal from the filtering is also not precise. However, if the discrepancies of information are not too big, then forward/backward extrapolated data may have a certain amount of coincident signals that are possible to use for deghosting. Moreover, the residual minimization procedure is also helpful to avoid generating severe artefacts from an inexact wavefield extrapolation result due to acquisition related uncertainties and sparse sampling.

Deghosting through an echo-deblending using coincidence filtering reduces or eliminates the uncertainty of parameter selection for the amplitude thresholding because the coincidence filtering employs only one parameter during the computation and employs a 'coincidence factor' that relates to a percentage of similarity. Systems employing this algorithm provide similar results with different values of this factor, where the only difference is the amount of recovered low-frequency component. Deghosting through an echo-deblending using coincidence filtering also facilitates recording-time matching and obtains results without severe ringing with the information provided. Thus, systems employing such an algorithm can avoid selecting noise in the computation and requiring exact acquisition information, such as water velocity, source/receiver depth and dense dataset for 3D dataset.

Figure 3B:
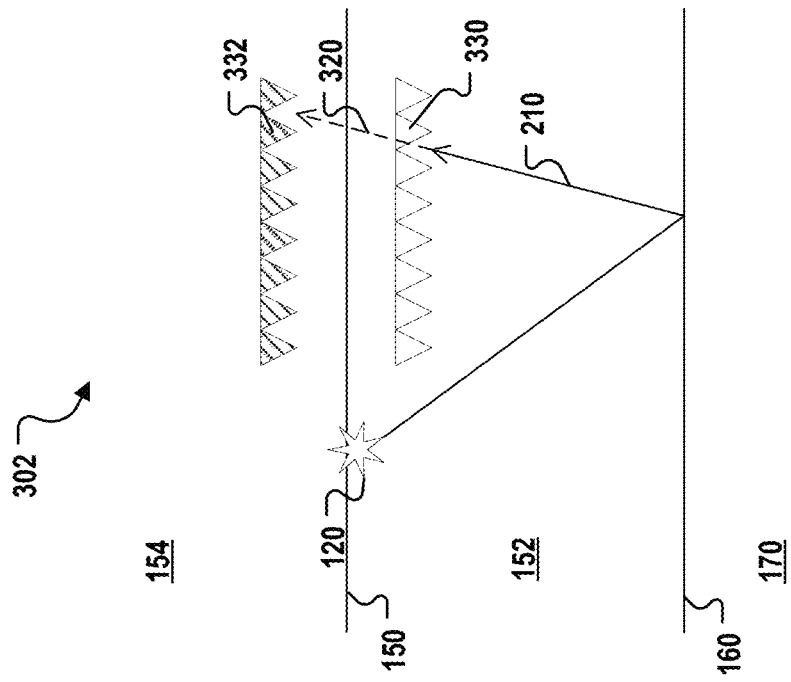
FIGS. 3A-3B depict example systems to conduct marine seismic surveys.
Figure 3A:
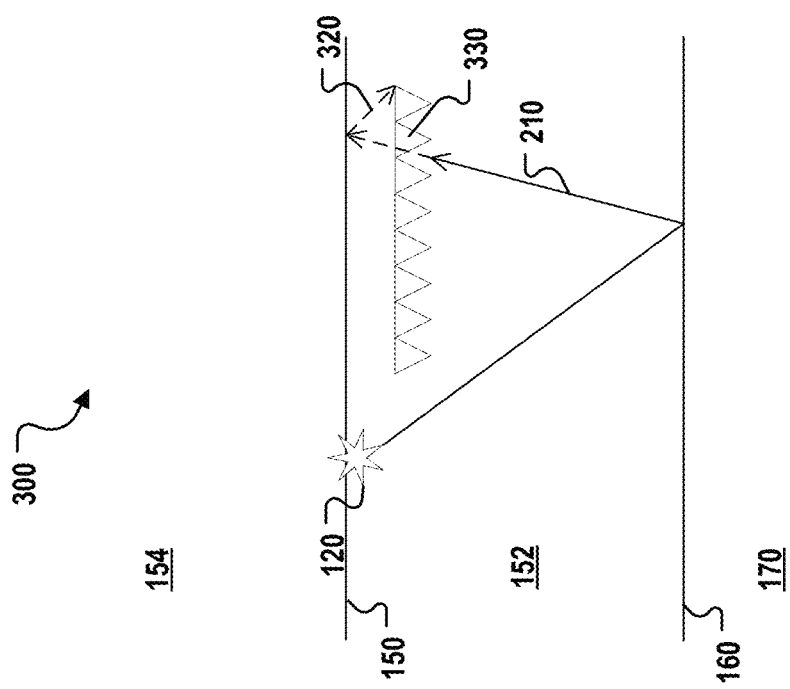

FIGS. 3A-3B depict example systems 300 and 302 to conduct marine seismic surveys. The example systems are substantially similar to system 100 depicted in FIGS. 1A-1B and 2C. The system 300 includes the mechanical wave source 120. As depicted in FIGS. 1A-1B and 2A-2C, the mechanical wave source 120 is positioned in the water 152 just be below the water surface 150 with the air 154 above. As described previously, the mechanical wave source generates a primary seismic wave 210, which reflects off of the seabed 160, the substrate 170, or both, and is received by detectors, such as detectors 134 (not shown). The ghost seismic wave 320 is reflected off the water surface 150 and received by the detectors 134. For simplicity, the ghost seismic wave 320 represents each type of ghost wave 220, 230, and 240 depicted in FIG. 2C. Signal 330 is the signal generated by the deployed detectors 134 based on the received primary seismic waves 210 and ghost seismic wave 320.

FIG. 3B depicts an example system 302 to conduct marine seismic surveys. The example system illustrates how the ghost seismic waves 320 are considered in the echo-blending concept. The system 302 is substantially similar to example 300 except that the ghost seismic waves 320 are depicted as the signal recorded at a virtual mirrored receiver, which can be described mathematically with Lloyd's mirror theory that includes an optical arrangement for producing interference fringes. As depicted, signal 330 includes the primary wave 210 data and signal 332 includes the ghost wave 320 data.

Figure 4:
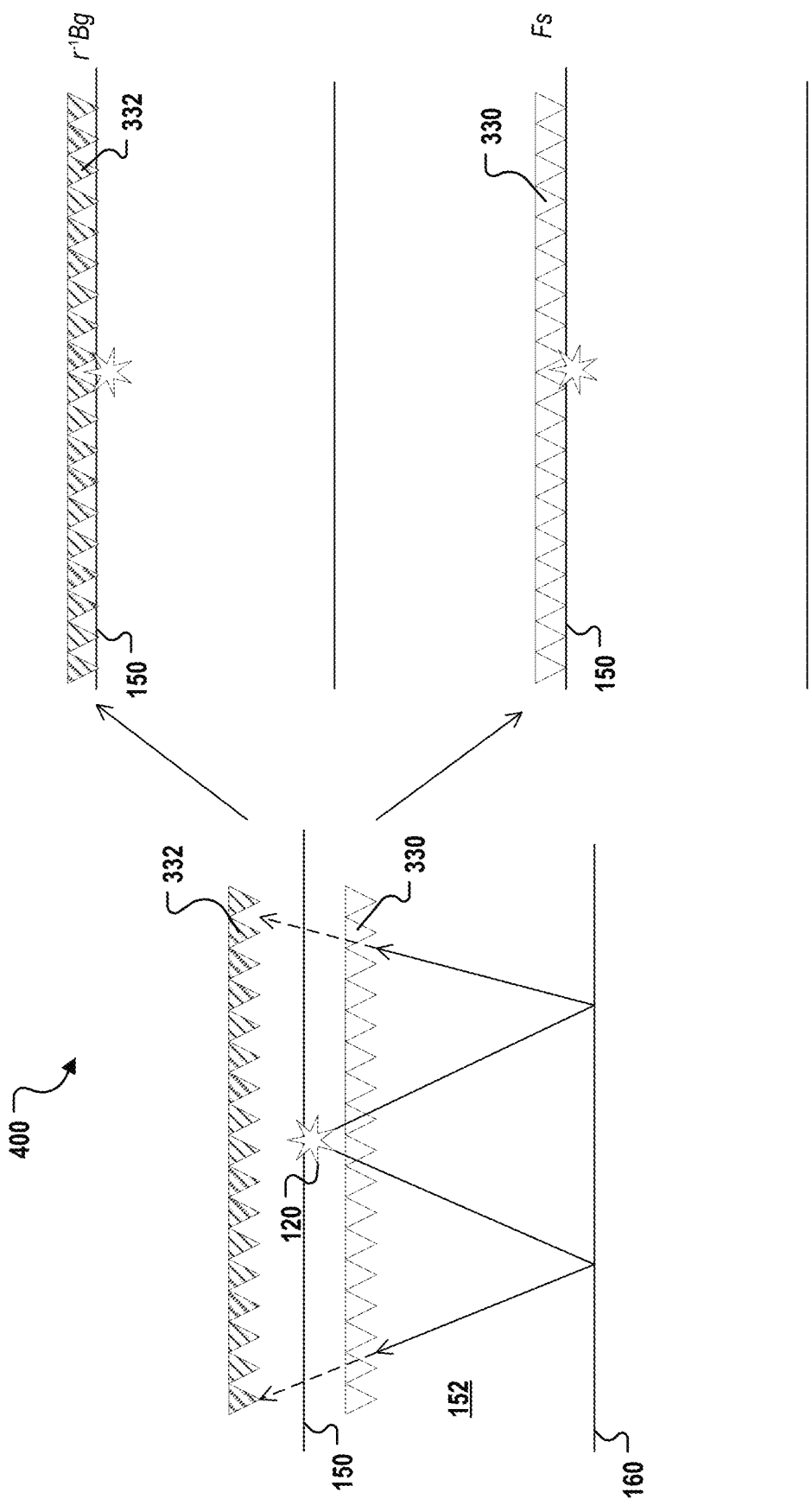
FIG. 4 depicts an extrapolation of the primary-wave signal and the ghost wave signal.

FIG. 4 depicts an extrapolation 400 of the primary-wave signal 330 and the ghost-waves signal 332. Offshore seismic datasets can be defined with the signal located in the sea surface. The primary-wave signal 330 and the ghost-wave signal 332 are the signals received by the detectors 134 (not shown) from the primary and ghost waves. These waves can be extrapolated to the sea surface 150 in which, F is the forward extrapolation operator and B is the backward extrapolation operator of Equations (1) and (2). In Equation (1), I represents the identity or a do-nothing operation meaning that (ideally) applying the combination of forward extrapolation and corresponding backward extrapolation (in any order) gives the same result as the input.

$$I = FB \quad (1)$$

$$F^{-1} = B \quad (2)$$

The ghost-wave signal 332 extrapolated to the sea surface has same amplitude and is present at the same time with the primary signal 330 extrapolated to the sea surface after division of the sea surface 150 reflectivity, which is represented by (r) in Equation (3).

Figure 5:
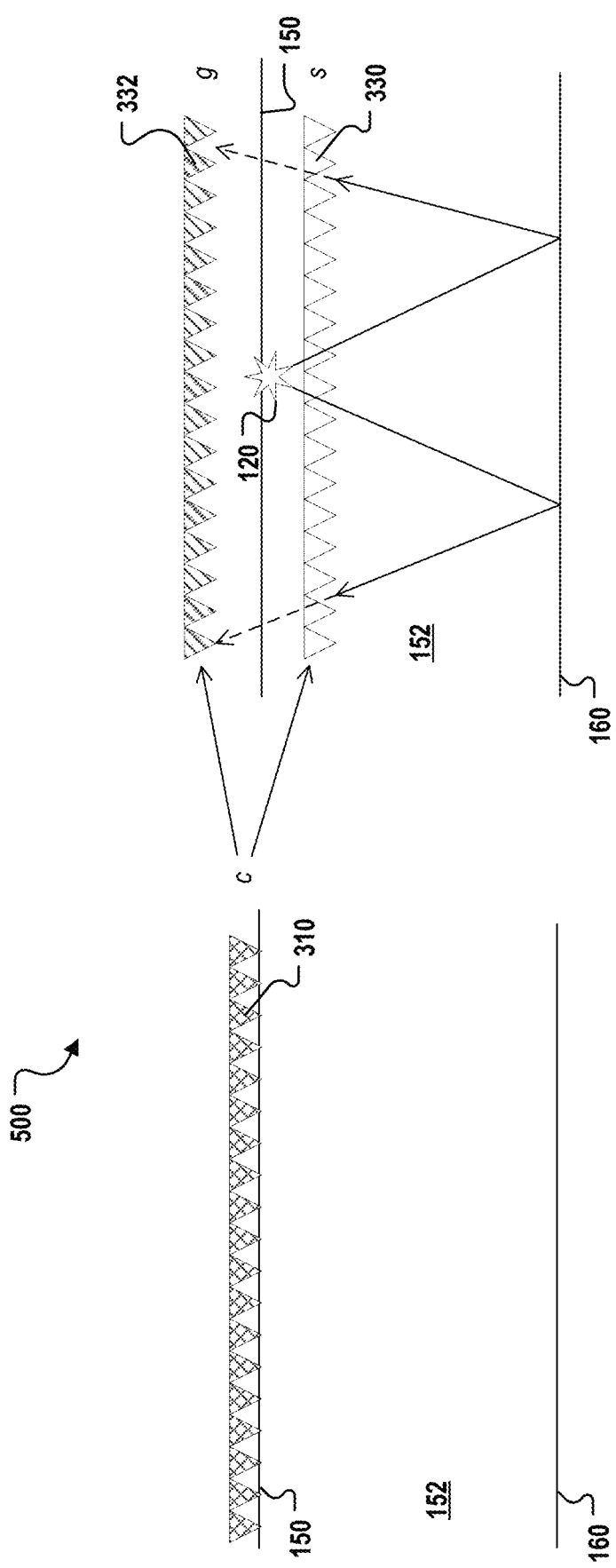
FIG. 5 depicts an extrapolation of the seismic data explained by the signal located at the sea surface.

FIG. 5 depicts an extrapolation 500 of the seismic data explained by the signal 310 located at the sea surface 150 where the extrapolated signal 310 is defined as the "true coincident signal (c)". The primary-wave signal 330, which is represented by (s) in Equation (3), and the ghost-wave signal 332, which is represented by (g) in Equation (3), can be defined with the signals located in the sea surface 150. The ghost-wave signal 332 is defined according to g=rFc and the primary-wave signal 330 according to s=Bc. The seismic data (d) can be defined according to Equation 3:

$$d = s + g = Bc + rFc. \quad (3)$$

Using Equation (3), the deghosting result s can be calculated based on the computed coincident signal c.

For the computing of coincident signal c, the forward and back wavefield can be applied to extrapolation of the seismic data d. The forward extrapolation of d is defined according to Equation (4):

$$rFd = rF(Bc + rFc) = rFBc + rrFFcrc + rrFFc \quad (4)$$

The backward extrapolation of d is defined according to Equation (5):

$$Bd = B(Bc + rFc) = BBc + rBFc = BBc + rc \quad (5)$$

The described system may be employed for receiver deghosting, for source deghosting, or both. For source deghosting, to remove the source ghosts, acoustic reciprocity is applied. Acoustic reciprocity states that the recorded signals are the exact same when sources and receivers are interchanged, where a source depth then becomes a receiver depth and vice versa.

Figure 6:
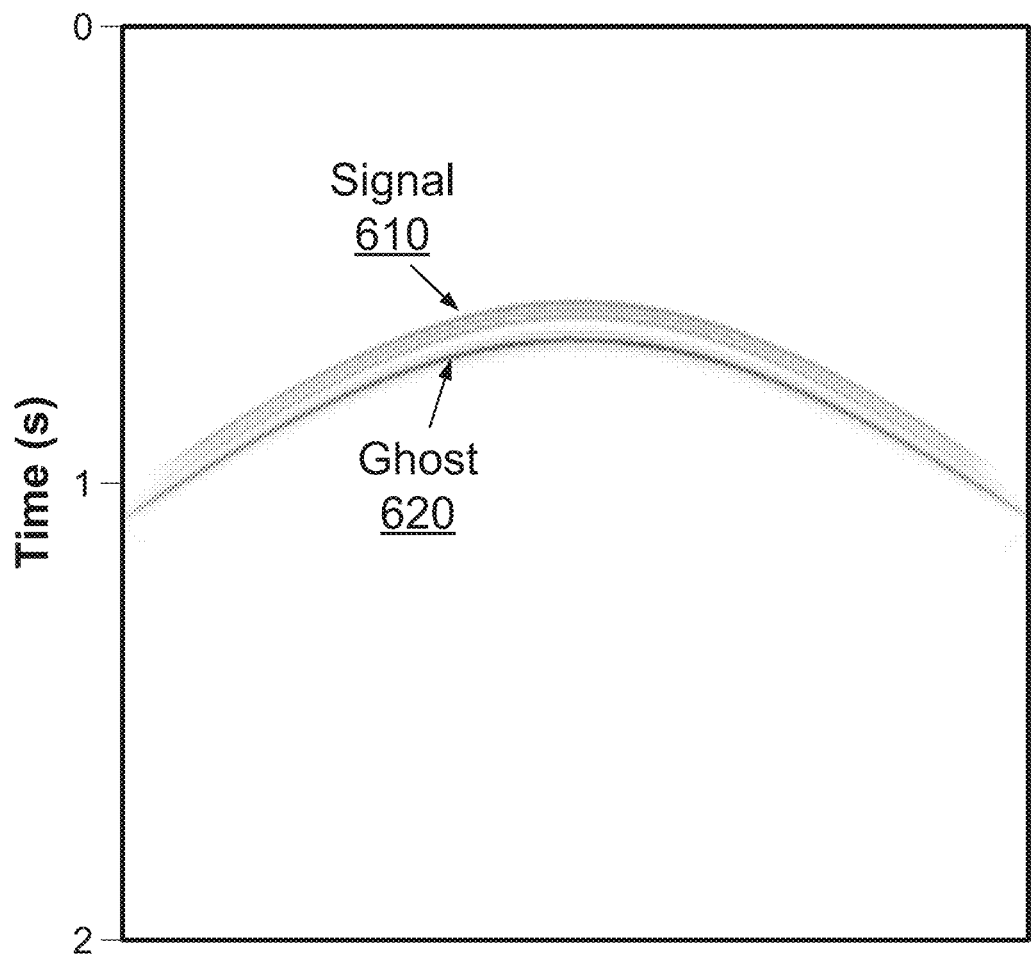
FIG. 6 depicts the primary signal and the ghost signal.

FIG. 6 depicts the primary (ghost-free) signal 610 and the ghost signal 620. As also depicted in FIGS. 4 and 5, the early arriving signal is the primary signal 610 (330 of FIGS. 4 and 5) and the late arriving signal is the ghost signal 620 (332 of FIGS. 4 and 5). The ghost signal 620 can be expressed as the product of the water reflectivity and wavefield extrapolated signal. Here, the reflection coefficient is assumed to equal −1, accounting only for polarity reversal.

Figure 7:
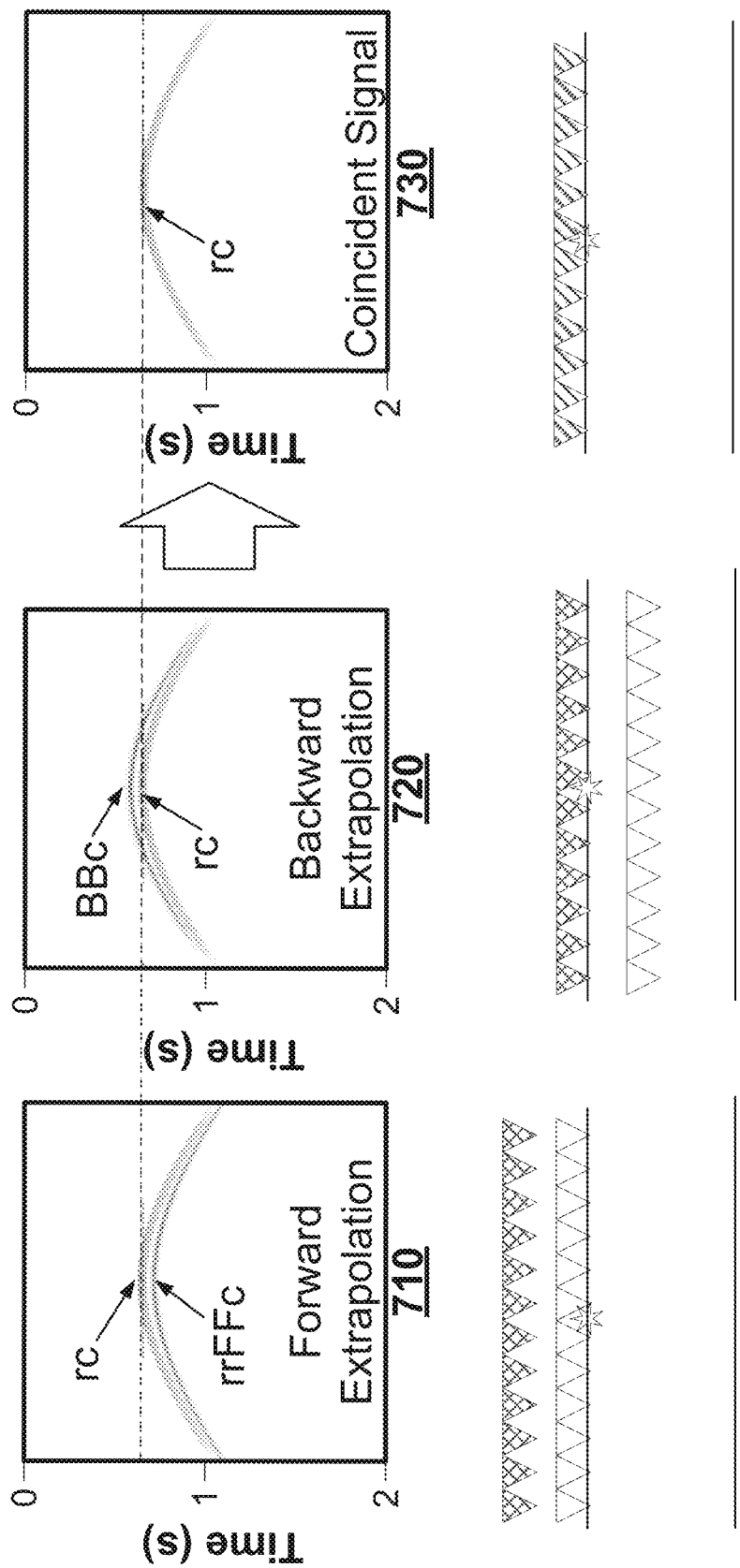
FIG. 7 depicts the forward and backward extrapolated seismic data and the computed coincident signal.

FIG. 7 depicts the forward 710 and backward 720 extrapolated seismic data (shown in FIG. 6) and the computed coincident signal 730. After forward and backward extrapolation, the signal and the ghost are located in same depth level. In addition, these two events have similar amplitude with reverse polarity. After the multiplication of a reflection coefficient to the ghost, coincidence filtering is applied to these extrapolated datasets. The coincidence filtering is non-causal, non-linear filtering that includes both of amplitude thresholding and travel-time matching in the time domain. Via the filtering, the selected events are similar in amplitude and located at a same time, thus a "coincident signal."

The "rrFFc" in the forward extrapolated signal and the "BBc" in the backward extrapolated are not matched in the travel time. Thus, the "c" can be extracted by filtering (coincidence filtering), which contains both amplitude thresholding and recording time matching in the time domain. This procedure can be expressed with mark array, which is denoted as (m(x, t)) and can be defined according to Equation (6):

$$m(x,t) = \begin{cases} 1 & \text{if } \left\{ \frac{|P(x,t) - R(x,t)|}{P(x,t) + R(x,t)} \leq k \right\} \cap \left\{ \frac{|Q(x,t) - R(x,t)|}{Q(x,t) + R(x,t)} \leq k \right\} \\ 0 & \text{else} \end{cases} \quad (6)$$

and $P(x,t) \cdot Q(x,t) > 0$ where, $R(x,t) = \{P(x,t) + Q(x,t)\} / (1 + \text{abs}(r))$ $c^i(x,t) = R(x,t) * m(x,t)$ Here, P(x, t) is the forward extrapolated d and Q(x, t) is the backward-extrapolated d. Value k is the thresholding value or "coincidence factor". However, because of seismic data does not contain only separable signals, the above filtering cannot compute the correct coincident signal c. The computed coincident signal is defined as c'.

As a result, the computed primary (ghost-free) signal is obtained by subtracting the computed coincident signal from the input after forward extrapolation according to Equation (7):

$$s' = d - rFc' \quad (7)$$

And the computed ghost according to Equation (8):

$$g' = d - Bc' \quad (8)$$

Here, the sign "'" denotes "computed" which may not be exact.

Because seismic data is the summation of ghost and primary (ghost-free) signal, the residual (E) may be defined according to Equation (9):

$$E = d - (s' + g') = d\{(d - rFc') + (d - Bc')\} = rFc' + Bc' - d \quad (9)$$

The misfit between the true coincident signal and the computed one can be reduced using Equation 9.

After forward/backward extrapolation of the residual, the forward extrapolated residual may be defined according to Equation (10):

$$FE = F(rFc' + Bc' - d) \quad (10)$$
$$= F(rFc' + Bc' - rFc - Bc)$$
$$= rFFc' + FBc' - rFFc - FBc$$
(since, $FB = I$)
$$= rFFc' + c' - rFFc - c,$$

and the backward extrapolation of residual may be defined according to Equation (11):

$$r^{-1}BE = r^{-1}B(rFc' + Bc' - d) \quad (11)$$
$$= r^{-1}B(rFc' + Bc' - rFc - Bc)$$
$$= r^{-1}rBFc' + r^{-1}BBc' - r^{-1}rBFc - r^{-1}BBc$$
(since, $FB = I$ and $r^{-1}r = 1$)
$$= c' + r^{-1}BBc' - c - r^{-1}BBc$$

The misfits of coincident signal may then be defined as e (e=c'−c), then the forward/backward extrapolated signals may be defined according to Equations (12) and (13):

$$FE = rFFc' + c' - rFFc - c = rFF(c' - c) + (c' - c) = rFFe + e, \quad (12)$$

and $$r^{-1}BE = c' + r^{-1}BBc' - c - r^{-1}BBc = (c' - c) + r^{-1}BB(c' - c) = r^{-1}BBe + e \quad (13)$$

Because of rFFe and $r^{-1}$BBe are not matched in time, the misfit "e" may be computed by coincident filtering again and the computed coincident signal can be updated by adding it.

The described system contributes to compute reasonable deghosting results with an imperfectly computed coincident signal. It may also help to overcome some amount of acquisition related uncertainties that usually leads strong artifact in most of deghosting algorithm.

The described system may also be employed to compute a deghosting result for noisy datasets. For example, a dataset contaminated with noise can be expressed according to Equation (14):

$$d = s + g + n = Bc + rFc + n, \quad (14)$$

where, n represents the noise. The forward/backward extrapolation of noisy data can be expressed according to Equation (15) and (16):

$$rFd = rc + rrFFc + rFn \text{ (Forward)} \quad (15)$$

$$Bd = rc + BBc + Bn \text{ (Backward)} \quad (16)$$

Similar to the terms rrFFc and BBc, the noise term rFn and Bn do not affect the coincident signal. Thus, the described algorithm is robust for the noise, as opposed to other known deghosting algorithms, which may lead to noise boosting after deghosting.

Figure 8:
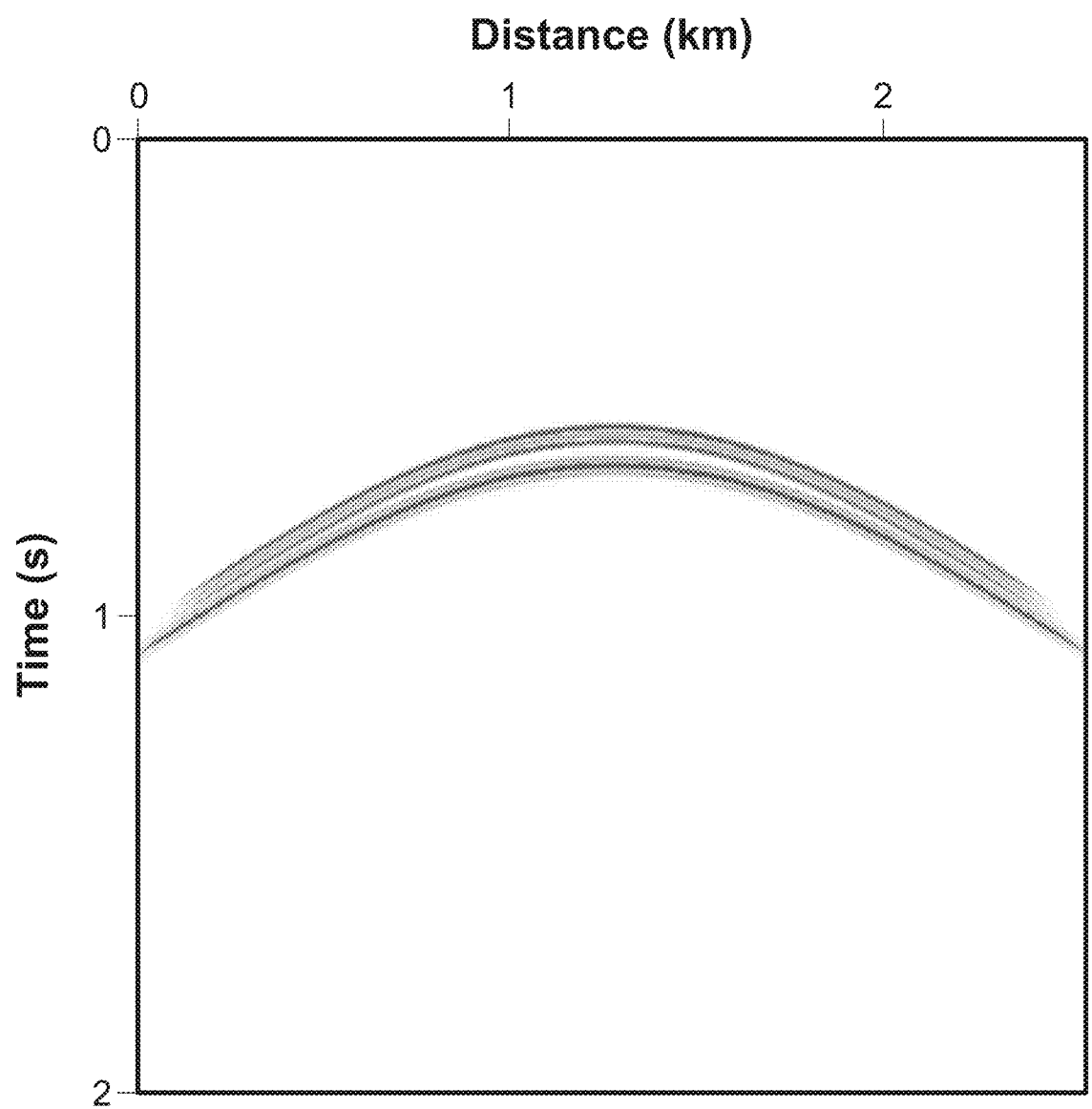
FIG. 8 depicts a synthetic example that contains ghost signal and a primary signal.

FIG. 8 depicts a synthetic example that contains a ghost signal and a primary (ghost-free) signal. By employing the described system, it is possible to obtain deghosting results without severe ringing artefacts originating from discrepancies of acquisition information. Because the deghosting procedure only selects the coincidence signal from an existed signal, no spurious or erroneous events are being created. The residual minimization procedure also helps to mitigate any artefacts from an inaccurate coincidence signal that originated from erroneous acquisition information. Furthermore, many known deghosting methods suffer from ringing artefacts when there are acquisition related uncertainties. The exampled depicted in FIG. 8 is generated with 50 meter (m) receiver depth and 1500 m/second (s) water velocity.

Figure 9C:
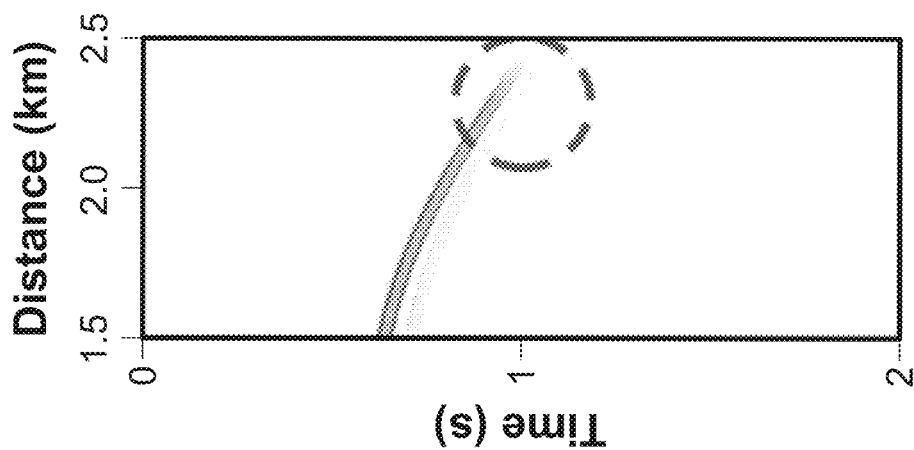
FIGS. 9A-9E depict various estimated deghosting results.
Figure 9B:
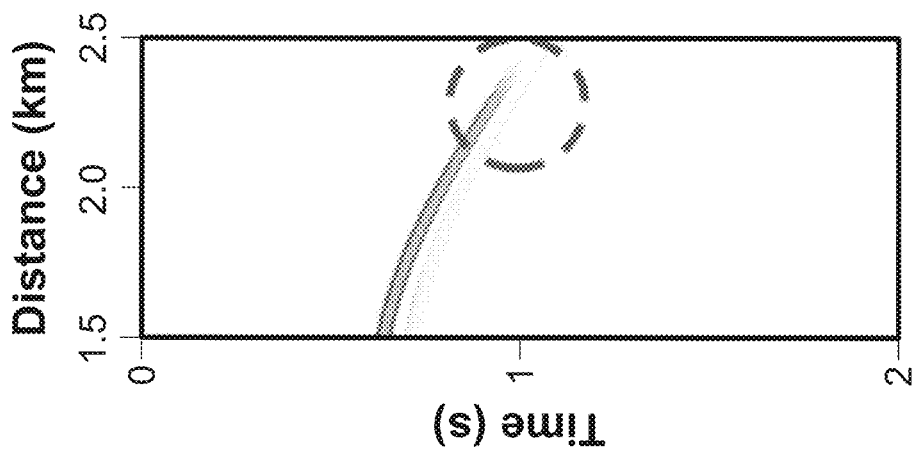
Figure 9A:
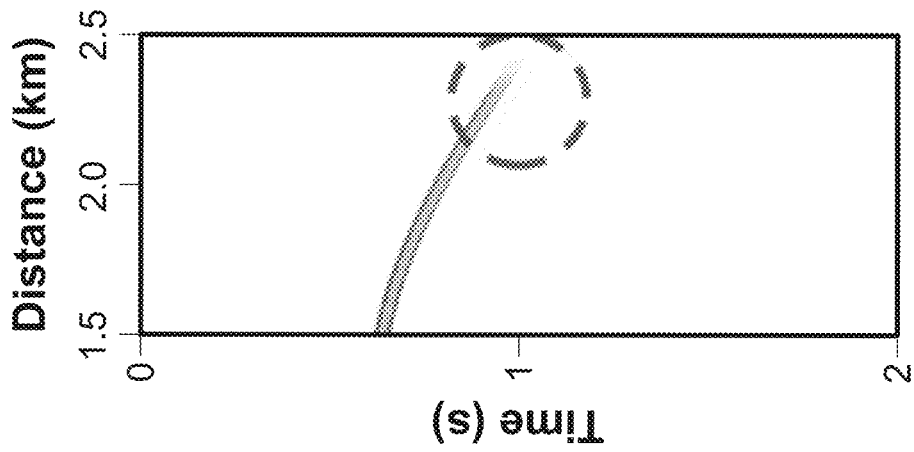
Figure 9E:
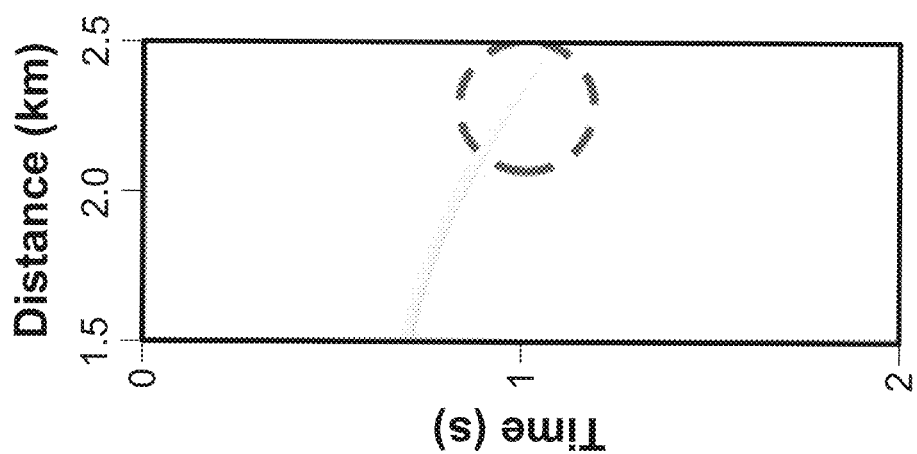
Figure 9D:
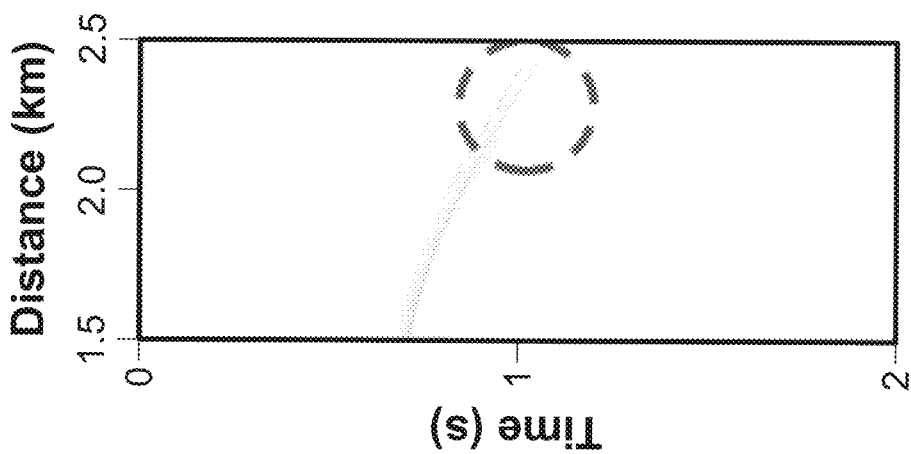

FIG. 9A depicts an estimated ghost-free result computed with correct receiver depth, after the first iteration. FIG. 9B depicts the corresponding deghosting result with wrong receiver depth (+1 m) before the residual minimization. FIG. 9C depicts the corresponding deghosting result with wrong receiver depth (+1 m) after the residual minimization. FIG. 9D depicts the difference between the estimated ghost-free signals computed with correct receiver depth (FIG. 9A) and wrong receiver depth (+1 m) before the residual minimization (FIG. 9B). FIG. 9E depicts the difference between the estimated ghost-free signals computed with correct receiver depth (FIG. 9A) and wrong receiver depth (+1 m) after the residual minimization (FIG. 9C). There are some misfits due to the wrong depth information. However, those results are still similar from the result with correct depth. Note that no ringing artefacts are introduced. The dashed circle area in FIGS. 9A-9E shows how the differences are changed via the residual minimization procedure.

Figure 10B:
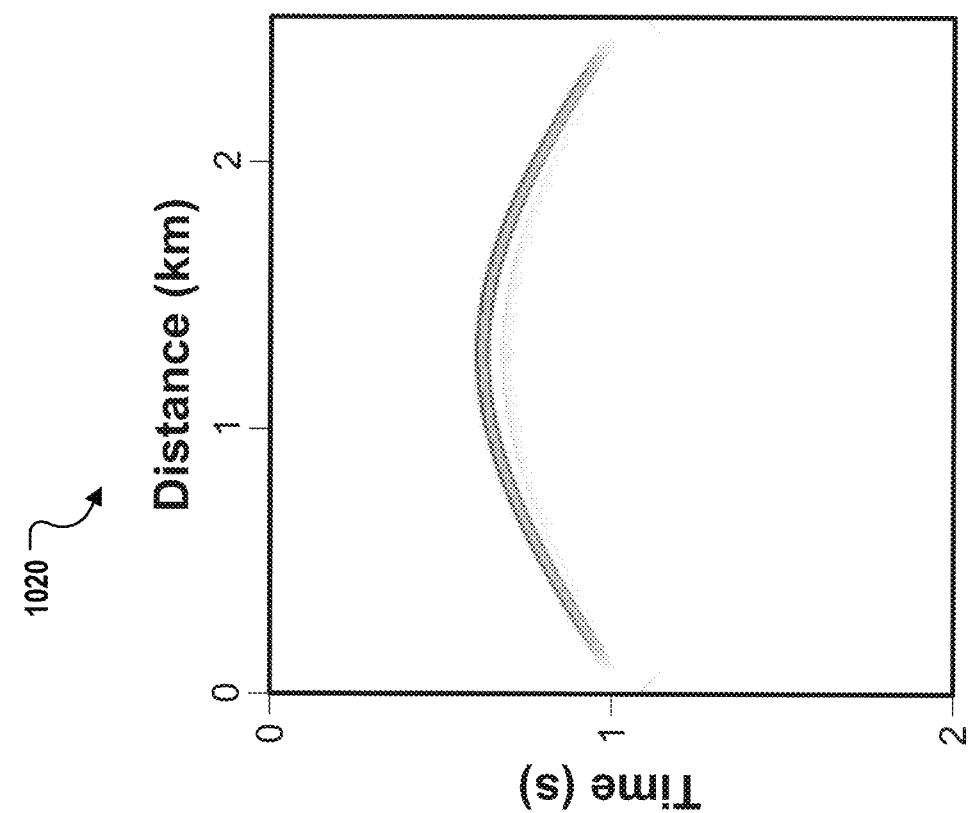
FIGS. 10A-10D depict the deghosting result obtained with the described system and the other deghosting methods.
Figure 10A:
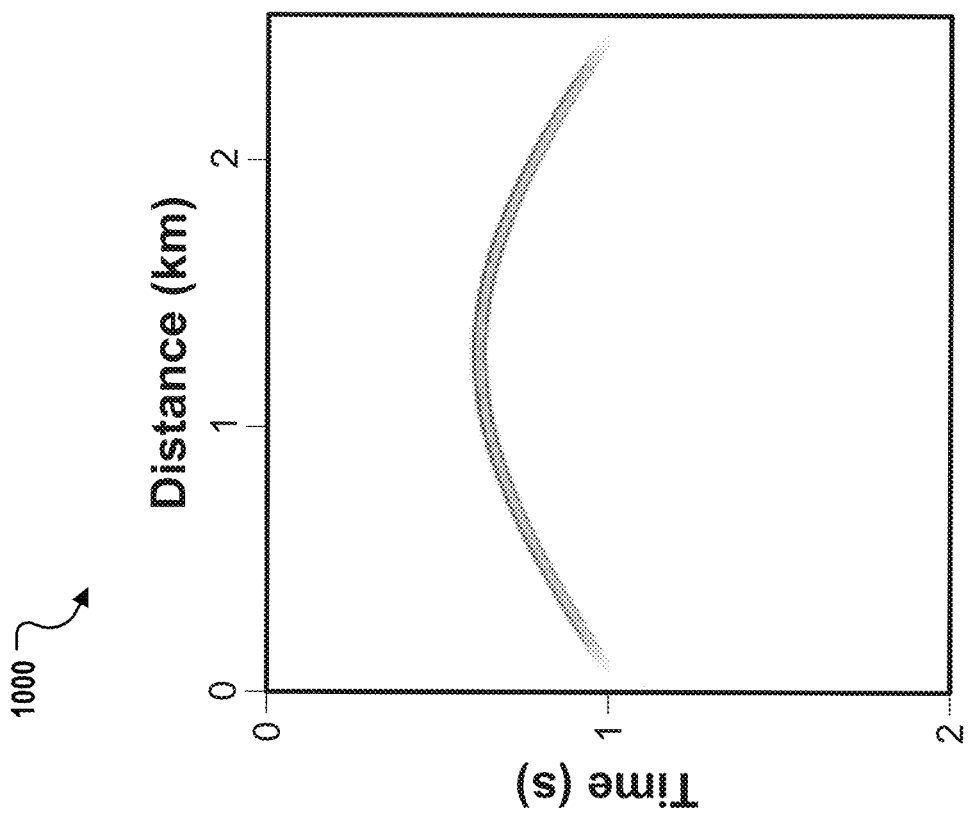
Figure 10D:
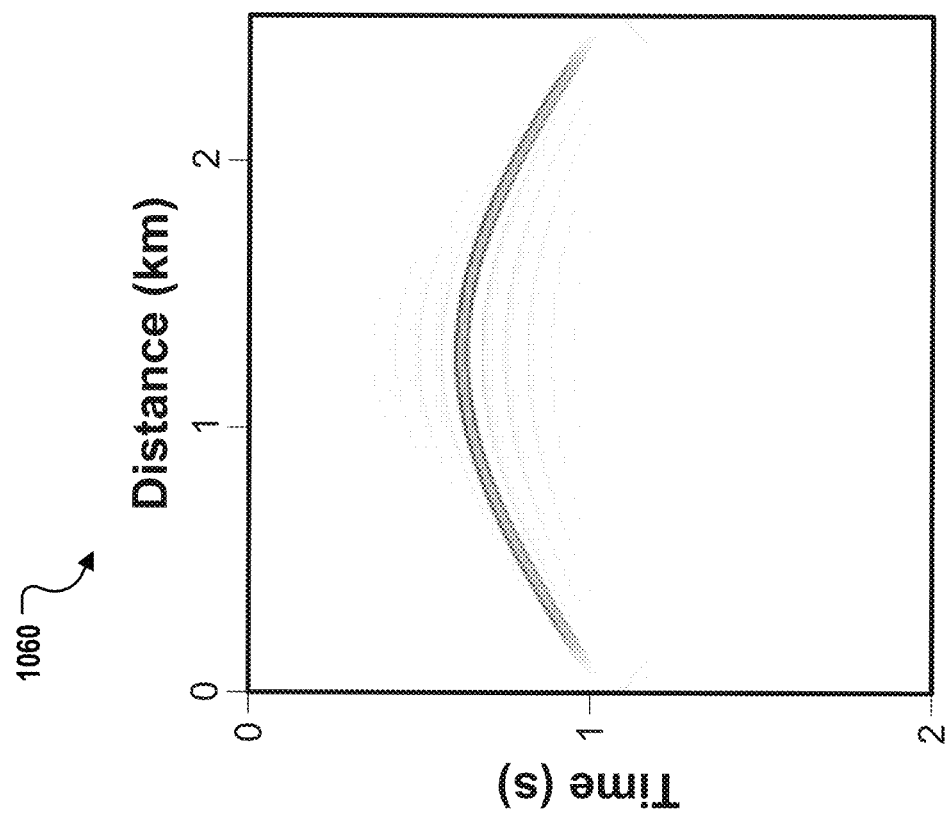
Figure 10C:
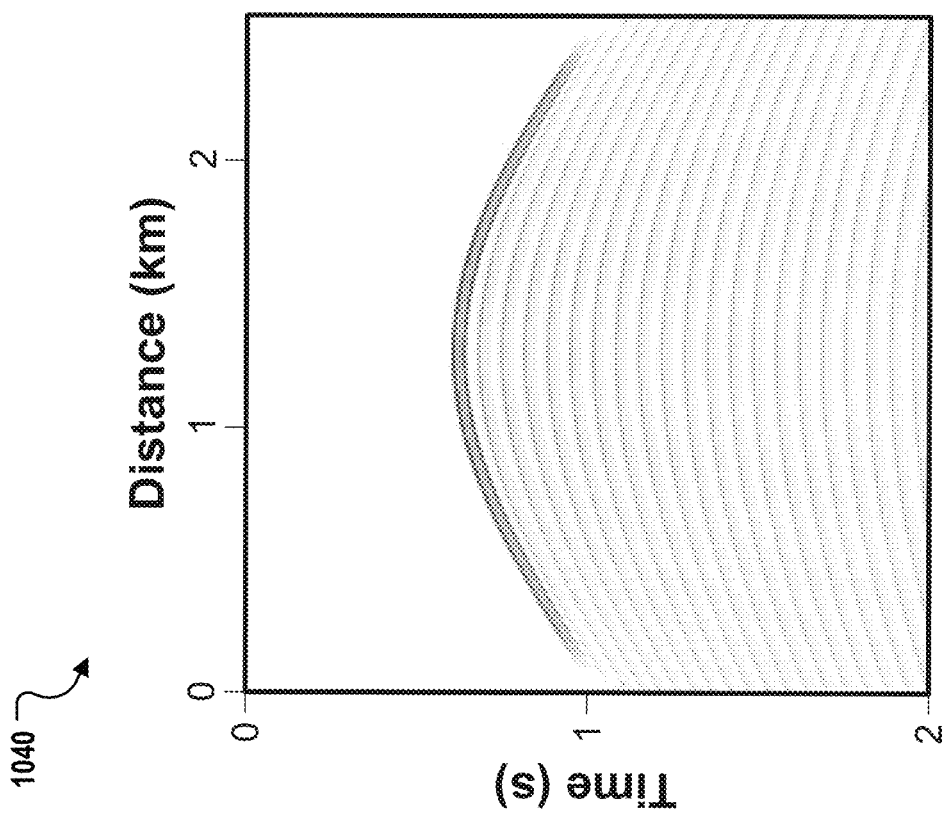

FIGS. 10A-10D depict the deghosting result obtained with the described system. FIG. 10A depicts the deghosting result 1000 with a correct depth (50 m). FIG. 10B-10D depict respectively deghosting result 1020 obtained with wrong receiver depth (51 m), the deghosting result 1040 obtained with an inversion based method with wrong receiver depth, and the deghosting result 1060 with an echo deblending method with wrong receiver depth. From these results, it can be seen that the proposed method does not generate severe ringing artefacts from the wrong information. However, large discrepancies may lead to the failure of deghosting, which may cause the coincidence filtering to breakdown.

Figure 11:
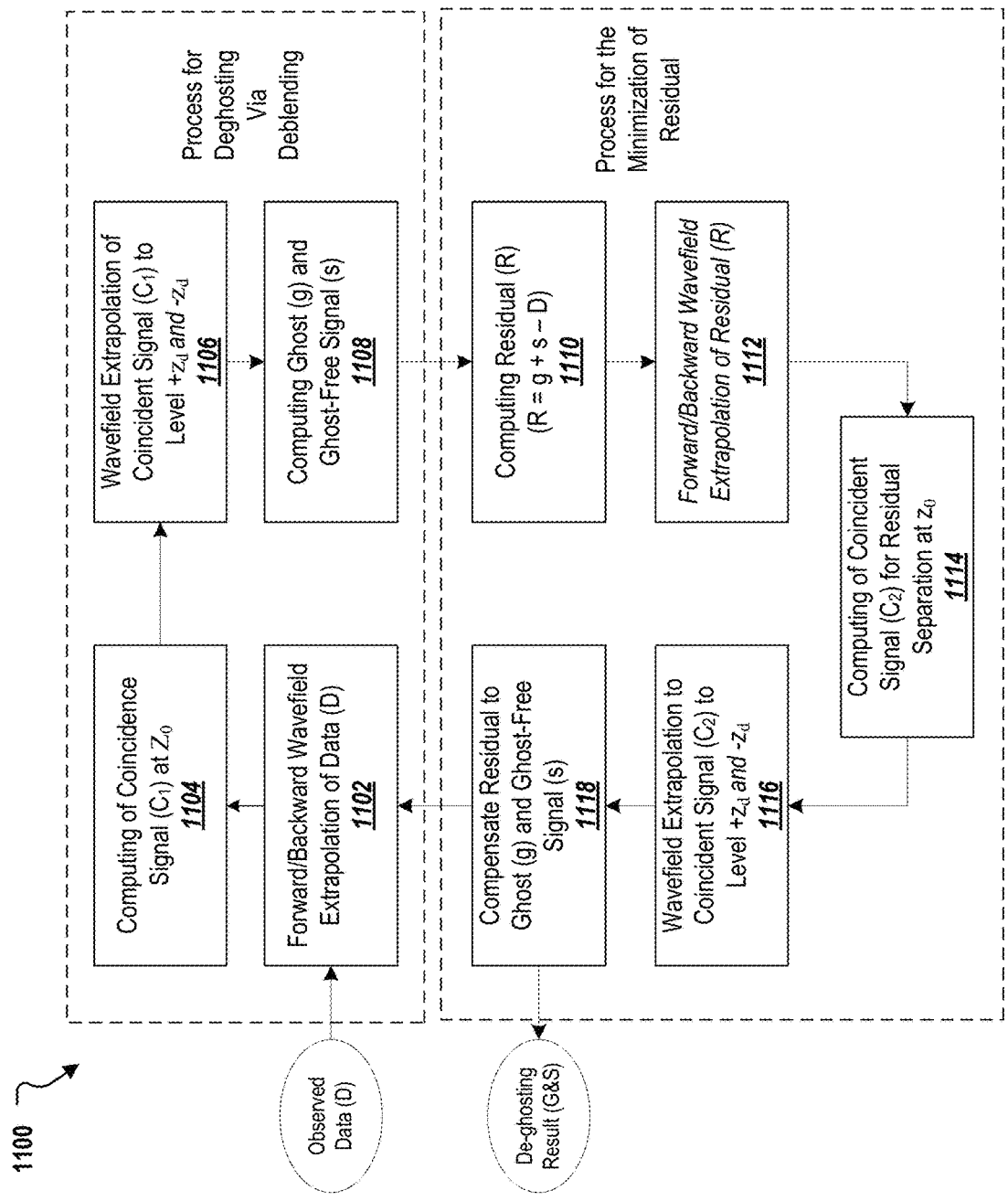
FIG. 11 depicts a flow diagram of an example echo-deblending using coincidence-filtering process employed to conduct marine seismic surveys.

FIG. 11 depicts a flow diagram of an example echo-deblending using coincidence-filtering process 1100 employed to conduct marine seismic surveys. For clarity of presentation, the description that follows generally describes method 1100 in the context of FIGS. 1A-10D and 12. However, it will be understood that method 1100 may be performed, for example, by any other suitable system, environment, software, and hardware, or a combination of systems, environments, software, and hardware. In some implementations, various steps of method 1100 can be run in parallel, in combination, in loops, or in any order. As depicted in FIG. 11, steps 1102 through 1108 are grouped together to form a process for deghosting, while steps 1110 through 1118 are grouped together to form a process for the minimization of the residual.

At 1102, observed data (D) from a system, such as example system 100, is received and forward and backward wavefield extrapolation is performed on the received data (D). The forward extrapolation brings the primary signal from the depth level of the detectors, such as detectors 134, where it is received, level with the water surface, and the backward extrapolation brings the ghost signal from the level of the virtual mirrored receivers where it is received to the level with the water surface (see FIG. 4). Thus, the primary signal and the ghost signal are located at the same time in each extrapolated domain. From 1102, the process 1100 proceeds to 1104.

At 1104, the coincidence signal ($C_1$) at (a constant depth of) $z_0$ is computed. In some implementations, $z_0$ is the mean or average sea level and is used as the zero reference depth. After forward and backward extrapolation, the primary signal and ghost signal (the events) have similar amplitude with reverse polarity. After the multiplication of a reflection coefficient to the ghost, the coincidence filtering is applied to these extrapolated datasets. The coincidence filtering is non-causal, non-linear filtering includes both of amplitude thresholding and travel-time matching. Through this filtering, the selected events are similar in amplitude and located at the same time. The signals are now referred to as a coincident signal $C_1$ (See FIG. 7). From 1104, the process 1100 proceeds to 1106.

At 1106, a wavefield extrapolation of the computed coincident signal ($C_1$) to level $+z_d$ and $-z_d$ is calculated. Assuming the positive direction of the depth axis is pointing downwards, then $+z_d$ is the detector level located below the sea-surface and $-z_d$ is the (virtual) detector level located above the sea-surface. The coincidence signal located at the water surface level becomes the estimated primary (ghost-free) signal with backward extrapolation and the estimated pure ghost after forward extrapolation with polarity reversal (See FIG. 4). From 1106, the process 1100 proceeds to 1108.

At 1108, the ghost signal (g) and the ghost-free signal (s) are computed by subtracting the extrapolated coincident signal ($C_1$). For example, subtracting the estimated ghost from the input data generates the computed primary signal. In the same manner, the ghost signal can be determined. From 1108, the process 1100 proceeds to 1110.

At 1110, the residual is computed (See. Equation (9)), which is then employed to improve the deghosting result. The residual can be defined as the difference between input data and the summation of computed primary signal and the ghost signal. Because both of the computed signals are generated from the same coincidence signal, the residual can be expressed with a computed coincident signal. The error can be defined as a misfit between a true and a computed coincident signal. From 1110, the process 1100 proceeds to 1112.

At 1112, the forward and backward wavefield extrapolations of the residual (R) are expressed by the error. From 1112, the process 1100 proceeds to 1114.

At 1114, the coincident signal ($C_2$) is computed for residual separation at $z_0$. The error can be obtained through the same deblending manner with coincidence filtering because the first two terms are located in a different time region. From 1114, the process 1100 proceeds to 1116.

At 1116, the wavefield extrapolation of the coincident signal $C_2$ to the level $+z_d$ and $-z_d$ is calculated. From 1116, the process 1100 proceeds to 1118.

At 1118, the process computes the residual to the ghost signal (g) (See Equation (8)) and the ghost-free/primary signal (s) (See Equation (7)). From 1118, the process 1100 ends or the information is passed to step 1102 and the process is repeated.

Figure 12:
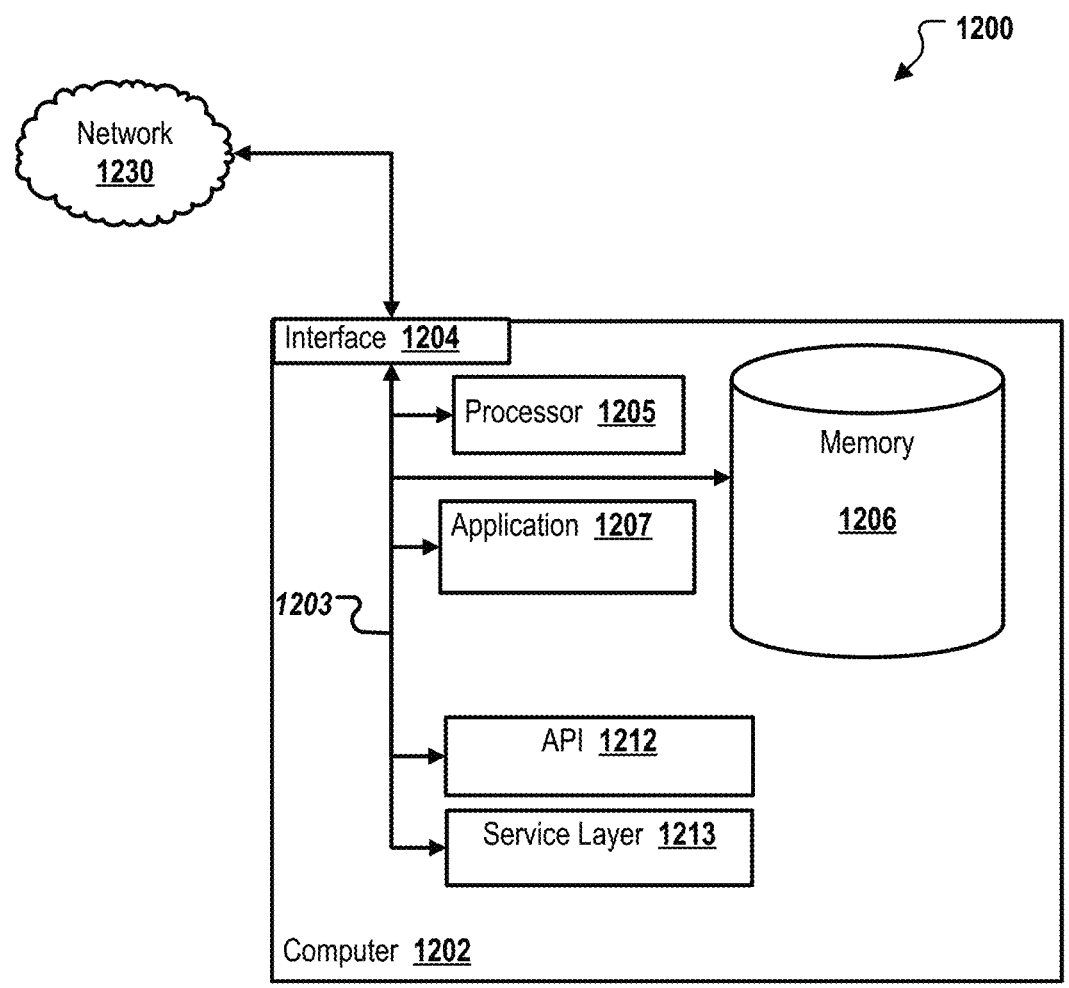
FIG. 12 depicts a block diagram of an exemplary computer system used to provide computational functionalities associated with described algorithms, methods, functions, processes, flows, and procedures as described in the instant disclosure, according to an implementation.

FIG. 12 depicts a block diagram of an exemplary computer system 1200 used to provide computational functionalities associated with described algorithms, methods, functions, processes, flows, and procedures as described in the instant disclosure, according to an implementation. The illustrated computer 1202 is intended to encompass any computing device such as a server, desktop computer, laptop or notebook computer, wireless data port, smart phone, personal data assistant (PDA), tablet computing device, or one or more processors within these devices, including both physical or virtual instances (or both) of the computing device. Additionally, the computer 1202 may comprise a computer that includes an input device, such as a keypad, keyboard, touch screen, or other device that can accept user information, and an output device that conveys information associated with the operation of the computer 1202, including digital data, visual, or audio information (or a combination of information), or a GUI.

The computer 1202 can serve in a role as a client, network component, a server, a database or other persistency, or any other component (or a combination of roles) of a computer system for performing the subject matter described in the instant disclosure. The illustrated computer 1202 is communicably coupled with a network 1230. In some implementations, one or more components of the computer 1202 may be configured to operate within environments, including cloud-computing-based, local, global, or a combination of environments.

At a high level, the computer 1202 is an electronic computing device operable to receive, transmit, process, store, or manage data and information associated with the described subject matter. According to some implementations, the computer 1202 may also include or be communicably coupled with an application server, e-mail server, web server, caching server, streaming data server, business intelligence (BI) server, or other server (or a combination of servers).

The computer 1202 can receive requests over network 1230 from a client application (for example, executing on another computer 1202) and responding to the received requests by processing the said requests in a software application. In addition, requests may also be sent to the computer 1202 from internal users (for example, from a command console or by other access method), external or third parties, other automated applications, as well as any other entities, individuals, systems, or computers.

Each of the components of the computer 1202 can communicate using a system bus 1203. In some implementations, any or all of the components of the computer 1202, both hardware or software (or a combination of hardware and software), may interface with each other or the interface 1204 (or a combination of both) over the system bus 1203 using an application programming interface (API) 1212 or a service layer 1213 (or a combination of the API 1212 and service layer 1213). The API 1212 may include specifications for routines, data structures, and object classes. The API 1212 may be either computer-language independent or dependent and refer to a complete interface, a single function, or even a set of APIs. The service layer 1213 provides software services to the computer 1202 or other components (whether or not illustrated) that are communicably coupled to the computer 1202. The functionality of the computer 1202 may be accessible for all service consumers using this service layer. Software services, such as those provided by the service layer 1213, provide reusable, defined business functionalities through a defined interface. For example, the interface may be software written in JAVA, C++, or other suitable language providing data in extensible markup language (XML) format or other suitable format. While illustrated as an integrated component of the computer 1202, alternative implementations may illustrate the API 1212 or the service layer 1213 as stand-alone components in relation to other components of the computer 1202 or other components (whether or not illustrated) that are communicably coupled to the computer 1202. Moreover, any or all parts of the API 1212 or the service layer 1213 may be implemented as child or sub-modules of another software module, enterprise application, or hardware module without departing from the scope of this disclosure.

The computer 1202 includes an interface 1204. Although illustrated as a single interface 1204 in FIG. 12, two or more interfaces 1204 may be used according to particular needs, desires, or particular implementations of the computer 1202. The interface 1204 is used by the computer 1202 for communicating with other systems in a distributed environment that are connected to the network 1230 (whether illustrated or not). Generally, the interface 1204 comprises logic encoded in software or hardware (or a combination of software and hardware) and operable to communicate with the network 1230. More specifically, the interface 1204 may comprise software supporting one or more communication protocols associated with communications such that the network 1230 or interface's hardware is operable to communicate physical signals within and outside of the illustrated computer 1202.

The computer 1202 includes a processor 1205. Although illustrated as a single processor 1205 in FIG. 12, two or more processors may be used according to particular needs, desires, or particular implementations of the computer 1202. Generally, the processor 1205 executes instructions and manipulates data to perform the operations of the computer 1202 and any algorithms, methods, functions, processes, flows, and procedures as described in the instant disclosure.

The computer 1202 also includes a memory 1206 that holds data for the computer 1202 or other components (or a combination of both) that can be connected to the network 1230 (whether illustrated or not). For example, memory 1206 can be a database storing data consistent with this disclosure. Although illustrated as a single memory 1206 in FIG. 12, two or more memories may be used according to particular needs, desires, or particular implementations of the computer 1202 and the described functionality. While memory 1206 is illustrated as an integral component of the computer 1202, in alternative implementations, memory 1206 can be external to the computer 1202.

The application 1207 is an algorithmic software engine providing functionality according to particular needs, desires, or particular implementations of the computer 1202, particularly with respect to functionality described in this disclosure. For example, application 1207 can serve as one or more components, modules, or applications. Further, although illustrated as a single application 1207, the application 1207 may be implemented as multiple applications 1207 on the computer 1202. In addition, although illustrated as integral to the computer 1202, in alternative implementations, the application 1207 can be external to the computer 1202.

There may be any number of computers 1202 associated with, or external to, a computer system containing computer 1202, each computer 1202 communicating over network 1230. Further, the term "client," "user," and other terminology may be used interchangeably as without departing from the scope of this disclosure. Moreover, this disclosure contemplates that many users may use one computer 1202, or that one user may use multiple computers 1202.

Described implementations of the subject matter can include one or more features, alone or in combination.

For example, in a first implementation, a computer-implemented method for echo-deblending executed by one or more processors, includes receiving an offshore seismic dataset of a surveyed subsurface. The offshore seismic dataset includes a primary-wave signal and a ghost-wave signal. A forward extrapolation and a backward extrapolation is determined for the offshore seismic dataset. A coincident signal is determined by applying a coincidence filtering to the forward extrapolation and the backward extrapolation. The coincident signal is extrapolated to determine a ghost-wave value for the ghost-wave signal. Adaptive subtraction is applied to the offshore seismic dataset with the ghost-wave value to determine a computed primary-wave value for the primary-wave signal. A model of the surveyed subsurface is generated based on primary-wave data calculated from the offshore seismic dataset based on the computed primary-wave value. A productivity of the surveyed subsurface is evaluated according to the model.

The foregoing and other described implementations can each optionally include one or more of the following features.

A first feature, combinable with any of the following features, the primary-wave signal is received by a detector located at a detector depth level, and the forward extrapolation brings the primary-wave signal from the detector depth level to a water surface level.

A second feature, the coincidence filtering is a non-causal, non-linear filtering that includes amplitude thresholding and travel-time matching.

A third feature, combinable with any of the previous or following features, the application of the coincidence filtering detects coincident signals in both time and space between the forward extrapolation and the backward extrapolation.

A fourth feature, combinable with any of the previous or following features, the method includes determining a residual based on a difference between the offshore seismic dataset and a summation of the primary-wave value and the ghost-wave value.

A fifth feature, combinable with any of the previous or following features, the forward extrapolation and the backward extrapolation are determined using 3D wavefield extrapolation operators.

A sixth feature, combinable with any of the previous or following features, the ghost-wave signal is expressed as a product of a water reflectivity and a wavefield extrapolated primary-wave signal.

A seventh feature, combinable with any of the previous or following features, the method includes before determining the coincident signal, multiplying the backward extrapolation with a reflection coefficient.

An eighth feature, combinable with any of the previous or following features, the offshore seismic dataset is a noisy dataset.

In a second implementation, one or more non-transitory computer-readable storage media are coupled to one or more processors. Instructions are stored on the one or more non-transitory computer-readable storage media that when executed by the one or more processors, cause the one or more processors to perform operations. These operations include receiving an offshore seismic dataset of a surveyed subsurface. The offshore seismic dataset includes a primary-wave signal and a ghost-wave signal. A forward extrapolation and a backward extrapolation is determined for the offshore seismic dataset. A coincident signal is determined by applying a coincidence filtering to the forward extrapolation and the backward extrapolation. The coincident signal is extrapolated to determine a ghost-wave value for the ghost-wave signal. Adaptive subtraction is applied to the offshore seismic dataset with the ghost-wave value to determine a computed primary-wave value for the primary-wave signal. A model of the surveyed subsurface is generated based on primary-wave data calculated from the offshore seismic dataset based on the computed primary-wave value. A productivity of the surveyed subsurface is evaluated according to the model.

The foregoing and other described implementations can each optionally include one or more of the following features.

A first feature, combinable with any of the following features, the primary-wave signal is received by a detector located at a detector depth level, and the forward extrapolation brings the primary-wave signal from the detector depth level to a water surface level.

A second feature, the coincidence filtering is a non-causal, non-linear filtering that includes amplitude thresholding and travel-time matching.

A third feature, combinable with any of the previous or following features, the application of the coincidence filtering detects coincident signals in both time and space between the forward extrapolation and the backward extrapolation.

A fourth feature, combinable with any of the previous or following features, the method includes determining a residual based on a difference between the offshore seismic dataset and a summation of the primary-wave value and the ghost-wave value.

A fifth feature, combinable with any of the previous or following features, the forward extrapolation and the backward extrapolation are determined using 3D wavefield extrapolation operators.

A sixth feature, combinable with any of the previous or following features, the ghost-wave signal is expressed as a product of a water reflectivity and a wavefield extrapolated primary-wave signal.

A seventh feature, combinable with any of the previous or following features, the method includes before determining the coincident signal, multiplying the backward extrapolation with a reflection coefficient.

An eighth feature, combinable with any of the previous or following features, the offshore seismic dataset is a noisy dataset.

In a third implementation, a system includes: a mechanical wave source that is configured to emit a pressure wavefield, a detector that is configured to receive at least a portion of the emitted pressure wavefield as a primary-wave signal and a ghost-wave signal, one or more processors; and a computer-readable storage device coupled to the one or more processors. The computer-readable storage device stores instructions that when executed by the one or more processors, cause the one or more processors to perform operations. These operations include receiving, from the detector, an offshore seismic dataset of a surveyed subsurface, the offshore seismic dataset comprising the primary-wave signal and the ghost-wave signal. A forward extrapolation and a backward extrapolation is determined for the offshore seismic dataset. A coincident signal is determined by applying a coincidence filtering to the forward extrapolation and the backward extrapolation. The coincident signal is extrapolated to determine a ghost-wave value for the ghost-wave signal. Adaptive subtraction is applied to the offshore seismic dataset with the ghost-wave value to determine a computed primary-wave value for the primary-wave signal. A model of the surveyed subsurface is generated based on primary-wave data calculated from the offshore seismic dataset based on the computed primary-wave value. A productivity of the surveyed subsurface is evaluated according to the model.

The foregoing and other described implementations can each optionally include one or more of the following features.

A first feature, combinable with any of the following features, the primary-wave signal is received by the detector located at a detector depth level, and the forward extrapolation brings the primary-wave signal from the detector depth level to a water surface level.

A second feature, the coincidence filtering is a non-causal, non-linear filtering that includes amplitude thresholding and travel-time matching.

A third feature, combinable with any of the previous or following features, the application of the coincidence filtering detects coincident signals in both time and space between the forward extrapolation and the backward extrapolation.

A fourth feature, combinable with any of the previous or following features, the method includes determining a residual based on a difference between the offshore seismic dataset and a summation of the primary-wave value and the ghost-wave value.

A fifth feature, combinable with any of the previous or following features, the forward extrapolation and the backward extrapolation are determined using 3D wavefield extrapolation operators.

A sixth feature, combinable with any of the previous or following features, the ghost-wave signal is expressed as a product of a water reflectivity and a wavefield extrapolated primary-wave signal.

A seventh feature, combinable with any of the previous or following features, the method includes before determining the coincident signal, multiplying the backward extrapolation with a reflection coefficient.

An eighth feature, combinable with any of the previous or following features, the offshore seismic dataset is a noisy dataset.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data. Such devices can include, for example, a programmable processor, a computer, or multiple processors or computers. The apparatus can also be or further include special purpose logic circuitry, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, or libraries. Conversely, the features and functionality of various components can be combined into single components.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and compact disc read-only memory (CD-ROM), Digital Versatile Disc (DVD)+/−R, DVD-RAM, and DVD-ROM disks. The memory may store various objects or data, including caches, classes, frameworks, applications, backup data, jobs, web pages, web page templates, database tables, repositories storing dynamic information, and any other information including any parameters, variables, algorithms, instructions, rules, constraints, or references thereto. Additionally, the memory may include any other data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), Light Emitting Diode (LED), or plasma monitor, for displaying information to the user and a keyboard and a pointing device, for example, a mouse, trackball, or trackpad, by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term graphical user interface (GUI) may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI)

that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an API or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of the described system or on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described earlier as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed.

Moreover, the separation or integration of various system modules and components in the implementations described earlier should not be understood as requiring such separation or integration in all implementations, and it should be understood that the described program components and systems can generally be integrated together in a single software product or packaged into multiple software products.

Accordingly, the earlier description of example implementations does not define or constrain this disclosure. Other changes, substitutions, and alterations are also possible without departing from the spirit and scope of this disclosure.

Furthermore, any claimed implementation described later is considered to be applicable to at least a computer-implemented method, a non-transitory, computer-readable medium storing computer-readable instructions to perform the computer-implemented method, and a computer system comprising a computer memory interoperably coupled with a hardware processor configured to perform the computer-implemented method or the instructions stored on the non-transitory, computer-readable medium.

What is claimed is:

1. A computer-implemented method for echo-deblending executed by one or more processors, the method comprising:

receiving an offshore seismic dataset of a surveyed subsurface, the offshore seismic dataset comprising a primary-wave signal and a ghost-wave signal;

determining a forward extrapolation (P(x, t)) and a backward extrapolation (Q(x, t)) for the offshore seismic dataset;

determining a coincident signal by applying a coincidence filtering to the forward extrapolation and the backward extrapolation, wherein the coincidence filtering is denoted as (m(x, t)) and defined as:

$$m(x, t) = \begin{cases} 1 & \text{if } \left\{ \frac{|P(x, t) - R(x, t)|}{P(x, t) + R(x, t)} \leq k \right\} \\ 0 & \end{cases} \cap \left\{ \begin{array}{c} \frac{|Q(x, t) - R(x, t)|}{Q(x, t) + R(x, t)} \leq k \\ \text{else} \end{array} \right\} \text{ and } P(x, t) \cdot Q(x, t) > 0$$

wherein R(x, t)={P(x, t)+Q (x, t)}/(1+abs(r)), k is a thresholding value, and r is a water reflectivity;
extrapolating the coincident signal to determine a ghost-wave value for the ghost-wave signal;
applying adaptive subtraction to the offshore seismic dataset with the ghost-wave value to determine a computed primary-wave value for the primary-wave signal;
generating a model of the surveyed subsurface based on primary-wave data calculated from the offshore seismic dataset based on the computed primary-wave value; and
evaluating a productivity of the surveyed subsurface according to the model.

2. The method of claim 1, wherein the primary-wave signal is received by a detector located at a detector depth level, and wherein the forward extrapolation brings the primary-wave signal from the detector depth level to a water surface level.

3. The method of claim 1, wherein the coincidence filtering is a non-causal, non-linear filtering that includes amplitude thresholding and travel-time matching.

4. The method of claim 3, wherein the application of the coincidence filtering detects coincident signals in both time and space between the forward extrapolation and the backward extrapolation.

5. The method of claim 1, further comprising:
determining a residual based on a difference between the offshore seismic dataset and a summation of the computed primary-wave value and the ghost-wave value.

6. The method of claim 1, wherein the forward extrapolation and the backward extrapolation are determined using three-dimensional (3D) wavefield extrapolation operators.

7. The method of claim 1, wherein the ghost-wave signal is expressed as a product of the water reflectivity and a wavefield extrapolated primary-wave signal.

8. The method of claim 1, further comprising:
before determining the coincident signal, multiplying the backward extrapolation with a reflection coefficient.

9. The method of claim 1, wherein the offshore seismic dataset is a noisy dataset.

10. One or more non-transitory computer-readable storage media coupled to one or more processors and having instructions stored thereon which, when executed by the one or more processors, cause the one or more processors to perform operations comprising:
receiving an offshore seismic dataset of a surveyed subsurface, the offshore seismic dataset comprising a primary-wave signal and a ghost-wave signal;
determining a forward extrapolation (P(x, t)) and a backward extrapolation (Q(x, t)) for the offshore seismic dataset;
determining a coincident signal by applying a coincidence filtering to the forward extrapolation and the backward extrapolation, wherein the coincidence filtering is denoted as (m(x, t)) and defined as:

$$m(x, t) = \begin{cases} 1 & \text{if } \left\{ \frac{|P(x, t) - R(x, t)|}{P(x, t) + R(x, t)} \leq k \right\} \\ 0 & \end{cases} \cap \left\{ \begin{array}{c} \frac{|Q(x, t) - R(x, t)|}{Q(x, t) + R(x, t)} \leq k \\ \text{else} \end{array} \right\} \text{ and } P(x, t) \cdot Q(x, t) > 0$$

wherein R(x, t)={P(x, t)+Q(x, t)}/(1+abs(r)), k is a thresholding value, and r is a water reflectivity;
extrapolating the coincident signal to determine a ghost-wave value for the ghost-wave signal;
applying adaptive subtraction to the offshore seismic dataset with the ghost-wave value to determine a computed primary-wave value for the primary-wave signal;
generating a model of the surveyed subsurface based on primary-wave data calculated from the offshore seismic dataset based on the computed primary-wave value; and
evaluating a productivity of the surveyed subsurface according to the model.

11. The one or more non-transitory computer-readable storage media of claim 10, wherein the operations further comprise:
before determining the coincident signal, multiplying the backward extrapolation with a reflection coefficient.

12. The one or more non-transitory computer-readable storage media of claim 10, wherein the coincidence filtering is a non-causal, non-linear filtering that includes amplitude thresholding and travel-time matching.

13. The one or more non-transitory computer-readable storage media of claim 12, wherein the application of the coincidence filtering detects coincident signals in both time and space between the forward extrapolation and the backward extrapolation.

14. The one or more non-transitory computer-readable storage media of claim 10, wherein the operations further comprise:
determining a residual based on a difference between the offshore seismic dataset and a summation of the computed primary-wave value and the ghost-wave value.

15. A system, comprising:
a mechanical wave source configured to emit a pressure wavefield;
a detector configured to receive at least a portion of the emitted pressure wavefield as a primary-wave signal and a ghost-wave signal;
one or more processors; and
a computer-readable storage device coupled to the one or more processors and having instructions stored thereon which, when executed by the one or more processors, cause the one or more processors to perform operations comprising:
receiving, from the detector, an offshore seismic dataset of a surveyed subsurface, the offshore seismic dataset comprising the primary-wave signal and the ghost-wave signal;
determining a forward extrapolation (P(x, t)) and a backward extrapolation (Q(x, t)) for the offshore seismic dataset;

determining a coincident signal by applying a coincidence filtering to the forward extrapolation and the backward extrapolation, wherein the coincidence filtering is denoted as (m(x, t)) and defined as:

$$m(x, t) = \begin{cases} 1 & \text{if } \left\{ \frac{|P(x, t) - R(x, t)|}{P(x, t) + R(x, t)} \leq k \right\} \\ 0 \end{cases} \cap$$

$$\left\{ \begin{array}{c} \frac{|Q(x, t) - R(x, t)|}{Q(x, t) + R(x, t)} \leq k \\ \text{else} \end{array} \right\} \text{ and } P(x, t) \cdot Q(x, t) > 0$$

wherein R(x, t)={P(x, t)+Q(x, t)}/(1+abs(r)), k is a thresholding value, and r is a water reflectivity;

extrapolating the coincident signal to determine a ghost-wave value for the ghost-wave signal;

applying adaptive subtraction to the offshore seismic dataset with the ghost-wave value to determine a computed primary-wave value for the primary-wave signal;

generating a model of the surveyed subsurface based on primary-wave data calculated from the offshore seismic dataset based on the computed primary-wave value; and evaluating a productivity of the surveyed subsurface according to the model.

16. The system of claim 15, wherein the primary-wave signal is received by the detector located at a detector depth level, and wherein the forward extrapolation brings the primary-wave signal from the detector depth level to a water surface level.

17. The system of claim 15, wherein the operations further comprise:

determining a residual based on a difference between the offshore seismic dataset and a summation of the computed primary-wave value and the ghost-wave value.

18. The system of claim 15, wherein the forward extrapolation and the backward extrapolation are determined using three-dimensional (3D) wavefield extrapolation operators.

19. The system of claim 15, wherein the ghost-wave signal is expressed as a product of a water reflectivity and a wavefield extrapolated primary-wave signal.

20. The system of claim 15, wherein the operations further comprise:

before determining the coincident signal, multiplying the backward extrapolation with a reflection coefficient.

* * * * *